United States Patent
Shirai

(10) Patent No.: US 12,027,165 B2
(45) Date of Patent: Jul. 2, 2024

(54) COMPUTER PROGRAM, SERVER, TERMINAL, AND SPEECH SIGNAL PROCESSING METHOD

(71) Applicant: GREE, Inc., Tokyo (JP)

(72) Inventor: Akihiko Shirai, Tokyo (JP)

(73) Assignee: GREE, INC., Tokyo (JP)

( * ) Notice: Subject to any disclaimer, the term of this patent is extended or adjusted under 35 U.S.C. 154(b) by 466 days.

(21) Appl. No.: 17/371,116

(22) Filed: Jul. 9, 2021

(65) Prior Publication Data
US 2021/0335364 A1 Oct. 28, 2021

Related U.S. Application Data

(63) Continuation of application No. PCT/JP2020/000497, filed on Jan. 9, 2020.

(30) Foreign Application Priority Data

Jan. 10, 2019 (JP) .................................. 2019-002923
Feb. 14, 2019 (JP) .................................. 2019-024354

(51) Int. Cl.
*G10L 15/22* (2006.01)
*G06F 3/14* (2006.01)
*G10L 15/02* (2006.01)

(52) U.S. Cl.
CPC ................ *G10L 15/22* (2013.01); *G06F 3/14* (2013.01); *G10L 15/02* (2013.01)

(58) Field of Classification Search
CPC ....... G10L 15/22; G10L 15/02; G10L 21/003; G10L 2021/0135; G10L 21/013; G06F 3/14; G09G 2354/00; G09G 2370/022; G09G 2380/06

See application file for complete search history.

(56) References Cited

U.S. PATENT DOCUMENTS

| | | | | |
|---|---|---|---|---|
| 10,088,976 | B2* | 10/2018 | Kurzweil | .............. G06F 40/117 |
| 2009/0037179 | A1* | 2/2009 | Liu | .......................... G10L 13/08 |
| | | | | 704/260 |
| 2018/0342258 | A1* | 11/2018 | Huffman | ............... G10L 21/013 |
| 2019/0221225 | A1* | 7/2019 | Bricklin | ............... G10L 13/033 |
| 2021/0342433 | A1† | 11/2021 | Fujita | |
| 2022/0116270 | A1† | 4/2022 | Matsumura | |

FOREIGN PATENT DOCUMENTS

JP 2007-114561 A 5/2007
WO 2020/145353 † 7/2020

OTHER PUBLICATIONS

International Search Report and Written Opinion dated Mar. 31, 2020, received for PCT Application PCT/JP2020/000497, Filed on Jan. 9, 2020, 8 pages including English Translation.

* cited by examiner
† cited by third party

Primary Examiner — Huyen X Vo
(74) Attorney, Agent, or Firm — XSENSUS LLP

(57) ABSTRACT

A non-transitory computer readable medium stores computer executable instructions which, when executed by at least one processor, cause the at least one processor to acquire a speech signal of speech of a user; perform a signal processing on the speech signal to acquire at least one feature of the speech of the user; and control display of information, related to each of one or more first candidate converters having a feature corresponding to the at least one feature, to present the one or more first candidate converters for selection by the user.

19 Claims, 11 Drawing Sheets

FIG. 12

PRESETS RECOMMENDED FOR YOU

| 800A | 800B | 800C | 800D | 800E |
|---|---|---|---|---|
| ENTERTAINER $P_{13}$ | ACTRESS $P_{103}$ | SINGER $P_{255}$ | CASTER $P_{529}$ | BASEBALL PLAYER $P_{151}$ |
| PRICE 400 YEN | PRICE 200 YEN | PRICE 100 YEN | PRICE 50 YEN | PRICE 25 YEN |
| AVAILABLE NUMBER OF TIMES 10 | AVAILABLE NUMBER OF TIMES 20 | AVAILABLE NUMBER OF TIMES 40 | AVAILABLE NUMBER OF TIMES 80 | AVAILABLE NUMBER OF TIMES 160 |
| AVAILABLE TIME 10 MINUTES | AVAILABLE TIME 20 MINUTES | AVAILABLE TIME 40 MINUTES | AVAILABLE TIME 80 MINUTES | AVAILABLE TIME 160 MINUTES |
| CONCURRENT USER LIMIT 1 USER | CONCURRENT USER LIMIT 2 USERS | CONCURRENT USER LIMIT 4 USERS | CONCURRENT USER LIMIT 8 USERS | CONCURRENT USER LIMIT 16 USERS |

SELECT WHAT YOU WANT TO BUY

COMPUTER PROGRAM, SERVER, TERMINAL, AND SPEECH SIGNAL PROCESSING METHOD

CROSS-REFERENCE TO RELATED APPLICATIONS

The present application is a bypass continuation of PCT/JP2020/000497, filed Jan. 9, 2020, which claims priority to JP 2019-002923, filed Jan. 10, 2019, and JP 2019-024354, filed Feb. 14, 2019, and the entire contents of each are incorporated by reference.

TECHNICAL FIELD

The present disclosure relates to a voice changer that generates a processed speech signal by signal processing of a speech signal obtained from a speech of a user.

BACKGROUND

Nowadays, services or products for users to get speeches expressed by voices different from their own voices are available. In one conventional service, in response to a request from a user, another user having a beautiful voice records his or her own voice and sends back the recorded voice to the user.

Next, a conventional technology called a voice changer processes an input speech and outputs the processed speech is also known. One of hardware voice changers is, for example, voice transformer with a digital signal processor (DSP). Voice changes may also be embodied in software. Both of these voice changers process parameters including the pitch, formant, and the like of a speech signal output from a microphone in accordance with values set by a user and outputs a speech signal with the processed parameters. Furthermore, a mobile phone may apply a voice conversion algorithm to a speech signal output from a microphone. Thus, the mobile phone outputs a speech signal like the harmony of many people is added.

User Local Voice Changer is a service that provides a voice changer through a web site. With this service, a web browser records a speech of a user and uploads a generated speech file. The web browser also sets parameters including pitch, formant, conversion pattern, and the like. The set parameters are sent to a server. The server serving as a voice changer processes and reproduces the speech file in accordance with the set parameters.

SUMMARY

In an exemplary implementation of the present application, a non-transitory computer readable medium stores computer executable instructions which, when executed by at least one processor, cause the at least one processor to acquire a speech signal of speech of a user; perform a signal processing on the speech signal to acquire at least one feature of the speech of the user; and control display of information, related to each of one or more first candidate converters having a feature corresponding to the at least one feature, to present the one or more first candidate converters for selection by the user.

BRIEF DESCRIPTION OF THE DRAWINGS

FIG. 12 is a schematic view illustrating how a value of each converter is presented to a user of the terminal in the communication system shown in FIG. 1.

DETAILED DESCRIPTION OF THE DRAWINGS

Figure 1:
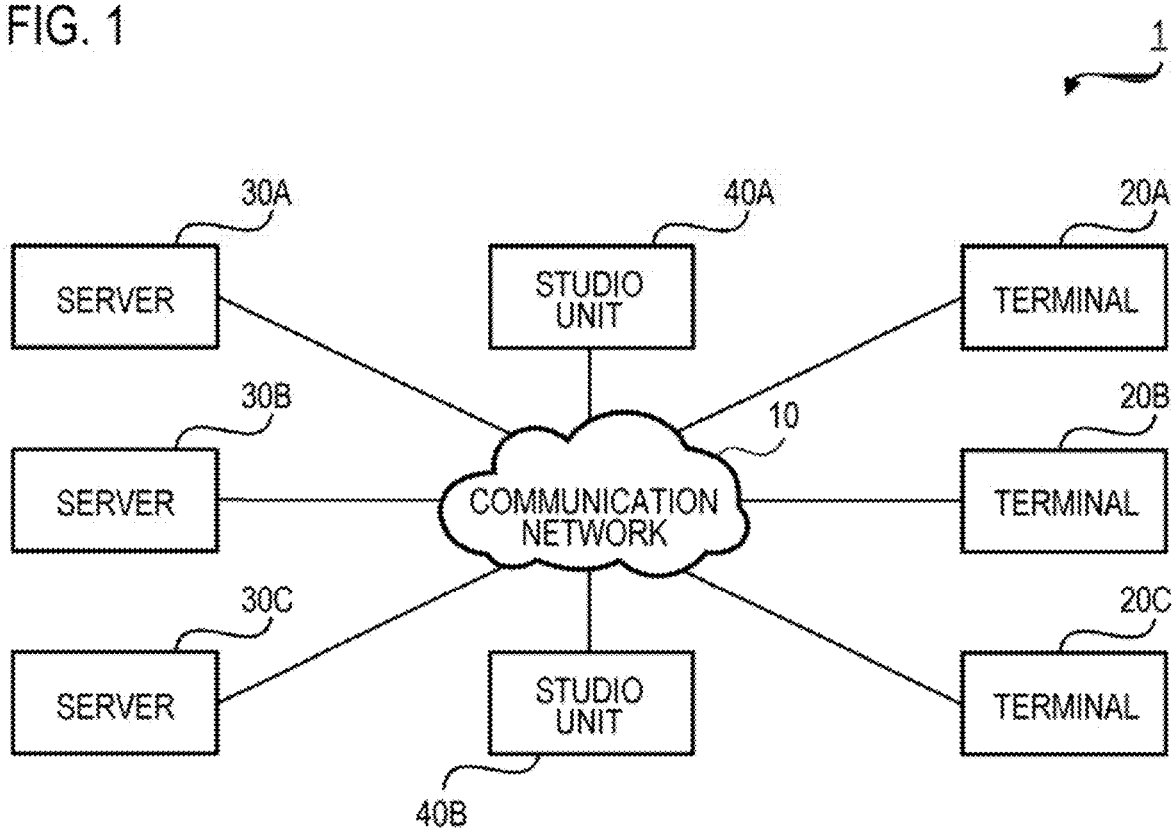
FIG. 1 is a block diagram of an exemplary configuration of a communication system according to the present disclosure.

Conventional voice changing technologies allow the setting of parameters such as pitch, formant, and the like. Voice changers can be implemented by acoustic theory and signal processing. As a result, for most of users who do not understand acoustic theory, it is difficult to intuitively understand how to set such parameters to reach desired voices. Therefore, even when such parameters are available, it is difficult for most of users not familiar with acoustic theory to reach desired voices. For users who do not clearly determine intended voices, it is more difficult to get satisfactory voices.

A conventional hardware voice changer enables real-time processing by signal processing with a DSP. In other words, such a voice changer enables parallel processing of acquiring a speech signal output from a microphone and outputting a processed speech. However, such a voice changer lacks flexibility in each of a plurality of phases, and it is not easy to flexibly change settings, connection, and the like in response to a request of each user in each phase. Here, a plurality of phases includes acquiring a speech signal output from a microphone, setting by a user via a user interface, outputting a processed speech, evaluating the characteristics of the processed speech by the user, and using the processed speech on, for example, a social networking service (SNS) or the like by way of a communication network.

Voice changing by conventional software allows for real-time processing. However, such voice changing has no function to provide a processed speech to a communication network. Additionally, with conventional voice changers, a quality of speech signal obtained is susceptible to a distance between a user and a microphone, a type of microphone in use, noise, and the like.

Use of a website to enable voice changing may provide a speech processed by the voice changer to a communication network. However, such a conventional voice changer adopts a configuration such that a server processes a speech received from a browser in accordance with parameters to be received from the browser thereafter. For this reason, the voice changer is unfit for real-time processing. Even if the voice changer is capable of achieving real-time processing, it would be difficult for a user to receive feedback and perform evaluation on how a processed speech is heard objectively.

The inventors of the present disclosure have recognized these issues of conventional technology. Therefore, the inventors of the present disclosure have developed technology to address these identified issues.

Methods and devices in accordance with the present disclosure may provide various processed speeches to users who lack knowledge about acoustic theory or who have not clearly determined an intended speech.

Methods and devices in accordance with the present disclosure may provide a speech processed by real-time processing to a communication network.

Methods and devices in accordance with the present disclosure may provide a processed speech of quality above a certain level regardless of the type, position, and the like of a microphone in use. Further, methods and devices in accordance with the present disclosure may enable an objective evaluation of a processed speech.

A non-transitory computer readable medium in accordance with the present disclosure stores computer executable instructions which, when executed by at least one processor, cause the at least one processor to perform operations. The operations may include separately acquiring a high-pitched speech of a user and a low-pitched speech of the user as a first speech signal and a second speech signal, respectively, acquiring a plurality of features calculated by signal processing of each of the first speech signal and the second speech signal, and acquiring, in accordance with the plurality of features, a converter that generates an output speech signal by converting at least one of the plurality of features of an input speech signal.

A server in accordance with the present disclosure may include at least one processor. The at least one processor may execute computer-readable instructions to separately acquire a high-pitched speech of a user and a low-pitched speech of the user as a first speech signal and a second speech signal, respectively, acquire a plurality of features calculated by signal processing of each of the first speech signal and the second speech signal, and acquire, in accordance with the plurality of features, a converter that generates an output speech signal by converting at least one of the plurality of features of an input speech signal.

A terminal in accordance with the present disclosure may include at least one processor. The at least one processor may execute computer-readable instructions to separately acquire a high-pitched speech of a user and a low-pitched speech of the user as a first speech signal and a second speech signal, respectively, acquire a plurality of features calculated by signal processing of each of the first speech signal and the second speech signal, and acquire, in accordance with the plurality of features, a converter that generates an output speech signal by converting at least one of the plurality of features of an input speech signal.

A speech signal processing method in accordance with the present disclosure may be executed on at least one processor that executes computer-readable instructions. The speech signal processing method may include, by the at least one processor executing the instructions, separately acquiring a high-pitched speech of a user and a low-pitched speech of the user as a first speech signal and a second speech signal, respectively, acquiring a plurality of features calculated by signal processing of each of the first speech signal and the second speech signal, and acquiring, in accordance with the plurality of features, a converter that generates an output speech signal by converting at least one of the plurality of features of an input speech signal.

A non-transitory computer readable medium in accordance with the present disclosure stores computer executable instructions which, when executed by at least one processor, cause the at least one processor to perform operations. The operations may include acquiring a speech of a user as a speech signal, acquiring at least one feature calculated by signal processing of the speech signal, and displaying information related to each of one or more first candidate converters having a feature approximate or equal to the at least one feature on a display section to present the one or more first candidate converters to the user as a choice.

A server in accordance with the present disclosure may include at least one processor. The at least one processor may execute computer-readable instructions to acquire a speech of a user as a speech signal, acquire at least one feature calculated by signal processing of the speech signal, and display information related to each of one or more first candidate converters having a feature approximate or equal to the at least one feature on a display section to present the one or more first candidate converters to the user as a choice.

A terminal in accordance with the present disclosure may include at least one processor. The at least one processor may execute computer-readable instructions to acquire a speech of a user as a speech signal, acquire at least one feature calculated by signal processing of the speech signal, and display information related to each of one or more first candidate converters having a feature approximate or equal to the at least one feature on a display section to present the one or more first candidate converters to the user as a choice.

A speech signal processing method in accordance with the present disclosure may be executed on at least one processor that executes computer-readable instructions. The speech signal processing method may include, by the at least one processor executing the instructions, acquiring a speech of a user as a speech signal, acquiring at least one feature calculated by signal processing of the speech signal, and displaying information related to each of one or more first candidate converters having a feature approximate or equal to the at least one feature on a display section to present the one or more first candidate converters to the user as a choice.

Hereinafter various embodiments of the present disclosure will be described with reference to the attached drawings. Like reference signs denote the same components throughout the drawings. It should be noted that some components in one drawing may be omitted in another drawing for the sake of convenience of illustration. Furthermore, it should be noted that the attached drawings are not always drawn to accurate scale.

1. Example of Communication System

FIG. 1 is a block diagram of an exemplary configuration of a communication system according to the present disclosure. As shown in FIG. 1, the communication system 1 may include one or more terminals 20 connected to a communication network 10 and one or more servers 30 connected to the communication network 10. FIG. 1 illustrates three terminals 20A to 20C as examples of the terminal 20. FIG. 1 illustrates three servers 30A to 30C as examples of the server 30. Another one or more terminals 20 can be connected to the communication network 10 as the terminals 20. Another one or more servers 30 can be connected to the communication network 10 as the servers 30.

The communication system 1 may include one or more studio units 40 connected to the communication network 10. FIG. 1 illustrates two studio units 40A and 40B as examples of the studio unit 40. Another one or more studio units 40 can be connected to the communication network 10 as the studio units 40.

In a first aspect, in the communication system 1 shown in FIG. 1, the terminal 20 (for example, the terminal 20A) operated by a user to run a predetermined application (audio/video streaming application or the like) is able to initially acquire a speech signal of a speech of the user facing the terminal 20A. The terminal 20A is able to acquire a converter in accordance with the acquired speech signal. The terminal 20A is able to generate a speech signal converted by using the acquired converter. The terminal 20A is able to send the generated speech signal (together with a video signal when needed) to the server 30 (for example, the server 30A) via the communication network 10. The server 30A is able to stream the speech signal received from the terminal 20A (together with a video signal when needed) via the communication network 10 to another one or more terminals 20 that are sources of requests to stream a speech/video. The other one or more terminals 20 are able to run a predetermined application (audio/video viewing application or the like) and send requests to stream a speech/video. In the specification, a predetermined application or a specific application may be one or more applications or may be a combination of one or more applications and one or more pieces of middleware.

In a second aspect, in the communication system 1 shown in FIG. 1, the server 30 (for example, the server 30B) installed in, for example, a studio or another location is able to initially acquire a speech signal of a speech of a user in the studio or the other location. The server 30B is able to acquire a converter in accordance with the acquired speech signal. The server 30B is able to generate a speech signal converted by using the acquired converter. The server 30B is able to stream the generated speech signal (together with a video signal when needed) via the communication network 10 to one or more terminals 20 that are sources of requests to stream a speech/video. The one or more terminals 20 are able to run a predetermined application (audio/video viewing application or the like) and send requests to stream a speech/video.

In a third aspect, in the communication system 1 shown in FIG. 1, the studio unit 40 installed in, for example, a studio or another location is able to initially acquire a speech signal of a speech of a user in the studio or the other location. The studio unit 40 is able to acquire a converter in accordance with the acquired speech signal. The studio unit 40 is able to generate a speech signal converted by using the acquired converter. The studio unit 40 is able to send the generated speech signal (together with a video signal when needed) to the server 30 (for example, the server 30A) via the communication network 10. The server 30A is able to stream the speech signal received from the studio unit 40 (together with a video signal when needed) via the communication network 10 to another one or more terminals 20 that are sources of requests to stream a speech/video. The other one or more terminals 20 are able to run a predetermined application (audio/video viewing application or the like) and send requests to stream a speech/video.

The communication network 10 may include, but not limited to, a mobile telephone network, a wireless LAN, a fixed telephone network, the Internet, an intranet, Ethernet (registered trademark), and/or other networks.

The terminal 20 is able to run an installed specific application. Thus, the terminal 20 is able to perform, for example, an operation to acquire a speech signal of a speech of a user. Thus, the terminal 20 is able to perform, for example, an operation to acquire a converter in accordance with the acquired speech signal. The terminal 20 is able to perform, for example, an operation to generate a speech signal converted by using the acquired converter. The terminal 20 is able to perform, for example, an operation to send the generated speech signal (together with a video signal when needed) to the server 30 (for example, the server 30A) via the communication network 10. Alternatively, the terminal 20 is able to open an installed web browser. Thus, the terminal 20 is able to receive a web page from the server 30, display the web page, and perform similar operations.

The terminal 20 can be any terminal capable of performing such operations. The terminals 20 may include, but not limited to, a smartphone, a tablet, a mobile phone (feature phone), a personal computer, and/or other devices.

In the first aspect, the server 30 is able to function as an application server by running an installed specific application. Thus, the server 30 is able to perform, for example, an operation to receive a speech signal of a user (together with a video signal when needed) from each terminal 20 via the communication network 10. The server 30 is able to perform, for example, an operation to stream the received speech signal (together with a video signal when needed) to each terminal 20 via the communication network 10. Alternatively, the server 30 is able to function as a web server by running an installed specific application. Thus, the server 30 is able to perform similar operations via a web page to be sent to each terminal 20.

In the second aspect, the server 30 is able to function as an application server by running an installed specific application. Thus, the server 30 is able to perform, for example, an operation to acquire a speech signal of a speech of a user in a studio or another location where the server 30 is installed. The server 30 is able to perform, for example, an operation to acquire a converter in accordance with the acquired speech signal. The server 30 is able to perform, for example, an operation to generate a speech signal converted by using the acquired converter. The server 30 is able to perform, for example, an operation to stream the generated speech signal (together with a video signal when needed) to each terminal 20 via the communication network 10. Alternatively, the server 30 is able to function as a web server by running an installed specific application. Thus, the server 30 is able to perform similar operations via a web page to be sent to each terminal 20.

In the third aspect, the server 30 is able to function as an application server by running an installed specific application. Thus, the server 30 is able to perform an operation to receive, from the studio unit 40 installed in a studio or another location, a speech signal of a user (together with a video signal when needed) in the studio or the like via the communication network 10. The server 30 is able to perform, for example, an operation to stream the received speech signal (together with a video signal when needed) to each terminal 20 via the communication network 10. Alternatively, the server 30 is able to function as a web server by running an installed specific application. Thus, the server 30 is able to perform similar operations via a web page to be sent to each studio unit 40.

The studio unit 40 is able to function as an information processing device by running an installed specific application. Thus, the studio unit 40 is able to perform, for example, an operation to acquire a speech signal of a speech of a user in a studio or another location where the studio unit 40 is installed. The studio unit 40 is able to perform, for example, an operation to acquire a converter in accordance with the acquired speech signal. The studio unit 40 is able to perform, for example, an operation to generate a speech signal converted by using the acquired converter. The studio unit 40 is able to perform, for example, an operation to send the generated speech signal (together with a video signal when needed) to the server 30 (for example, the server 30A) via the communication network 10. Alternatively, the studio unit 40 is able to open an installed web browser. Thus, the studio unit 40 is able to receive a web page from the server 30, display the web page, and perform similar operations.

2. Hardware Configuration of Each Device

Next, an example of the hardware configuration of each of the terminal 20, the server 30, and the studio unit 40 will be described.

2-1. Hardware Configuration of Terminal 20

Figure 2:
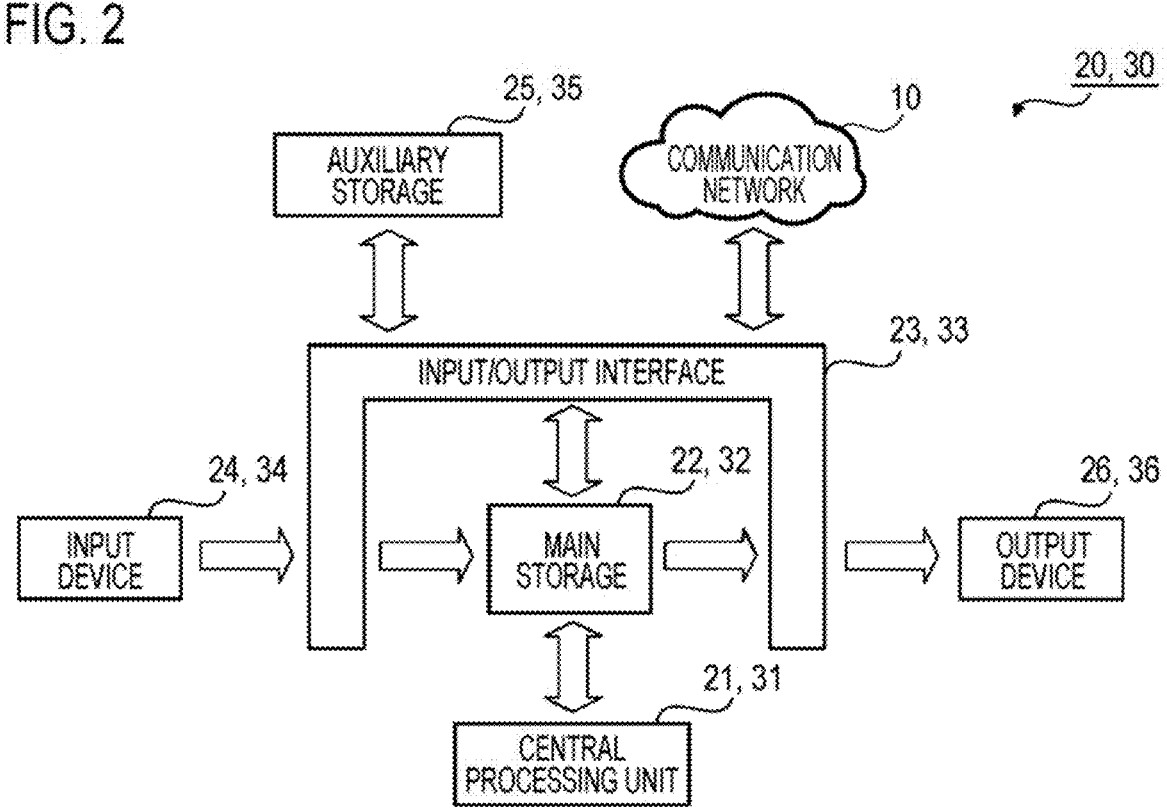
FIG. 2 is a schematic block diagram of a hardware configuration of a terminal or a server shown in FIG. 1.

An example of the hardware configuration of each terminal 20 will be described with reference to FIG. 2. FIG. 2 is a schematic block diagram of a hardware configuration of the terminal 20 and server 30 shown in FIG. 1 (reference signs associated with each server 30 as will be described later are also shown in FIG. 2).

As shown in FIG. 2, each terminal 20 may mainly include a central processing unit 21, a main storage 22, an input/output interface 23, an input device 24, an auxiliary storage 25, and an output device 26. These devices are connected by a data bus and/or a control bus.

The central processing unit 21 can be referred to as CPU. The central processing unit 21 is able to perform a computation on instructions and data stored in the main storage 22 and cause the main storage 22 to store the computation results. The central processing unit 21 is able to control the input device 24, the auxiliary storage 25, the output device 26, and the like via the input/output interface 23. The terminal 20 may include one or more of the central processing units 21. The central processing unit 21 may be encompassed by or compare control circuitry and/or processing circuitry. Additional structural configuration and discussion of central processing unit 21 is described below with respect to FIG. 13.

The main storage 22 can be referred to as memory. The main storage 22 is able to store instructions and data received via the input/output interface 23 and computation results of the central processing unit 21 from the input device 24, the auxiliary storage 25, the communication network 10, and the like (server 30 and the like). The main storage 22 may include, but not limited to, a random access memory (RAM), a read only memory (ROM), a flash memory, and/or the like.

The auxiliary storage 25 is a storage having a greater capacity than the main storage 22. The auxiliary storage 25 stores computer executable instructions and data (computer programs) that make up the specific application, a web browser, and the like. The auxiliary storage 25, when controlled by the central processing unit 21, is able to send these instructions and data (computer programs) to the main storage 22 via the input/output interface 23. The auxiliary storage 25 may include, but not limited to, a magnetic disk drive, an optical disk drive, and/or the like. In an exemplary implementation, the auxiliary storage 25 is a non-transitory computer readable medium.

The input device 24 can be a device that imports data from an outside. The input device 24 may include, but not limited to, a touch panel, a button, a keyboard, a mouse, a sensor (microphone), and/or the like.

The output device 26 may include, but not limited to, a display, a touch panel, a printer, and/or the like.

With such a hardware configuration, the central processing unit 21 is able to sequentially load the computer executable instructions and data, stored in the auxiliary storage 25 and making up the specific application, onto the main storage 22. The central processing unit 21 is able to control the output device 26 via the input/output interface 23 by computing the loaded instructions and data. Alternatively, the central processing unit 21 is able to send or receive various pieces of information to or from another device (for example, the server 30, another one of the terminals 20, or the like) via the input/output interface 23 and the communication network 10 by computing the loaded instructions and data.

Thus, the terminal 20 is able to acquire a speech signal of a speech of a user by running the installed specific application. The terminal 20 is able to acquire a converter in accordance with the acquired speech signal. The terminal 20 is able to generate a speech signal converted by using the acquired converter. The terminal 20 is able to send the generated speech signal (together with a video signal when needed) to the server 30 (for example, the server 30A) via the communication network 10. Alternatively, the terminal 20 is able to open an installed web browser. Thus, the terminal 20 is able to receive a web page from the server 30, display the web page, and perform similar operations.

The terminal 20 may include one or more microprocessors, and/or a graphics processing unit (GPU) instead of the central processing unit 21 or in addition to the central processing unit 21.

2-2. Hardware Configuration of Server 30

An example of the hardware configuration of each server 30 will be described also with reference to FIG. 2. For example, the same hardware configuration as the above-described hardware configuration of each terminal 20 can be used as the hardware configuration of each server 30. Therefore, reference signs assigned to the components of each server 30 are also indicated in FIG. 2.

As shown in FIG. 2, each server 30 may mainly include a central processing unit 31, a main storage 32, an input/output interface 33, an input device 34, an auxiliary storage 35, and an output device 36. These devices are connected by a data bus and/or a control bus.

Each of the central processing unit 31, the main storage 32, the input/output interface 33, the input device 34, the auxiliary storage 35, and the output device 36 may be substantially the same as the central processing unit 21, the main storage 22, the input/output interface 23, the input device 24, the auxiliary storage 25, and the output device 26 included in each of the above-described terminals 20.

The central processing unit 31 may be encompassed by or compare control circuitry and/or processing circuitry. Additional structural configuration and discussion of central processing unit 31 is described below with respect to FIG. 13.

With such a hardware configuration, the central processing unit 31 is able to sequentially load computer executable instructions and data (computer programs), stored in the auxiliary storage 35 and making up the specific application, onto the main storage 32. In an exemplary implementation, the auxiliary storage 25 is a non-transitory computer readable medium. The central processing unit 31 is able to control the output device 36 via the input/output interface 33 by computing the loaded instructions and data. Alternatively, the central processing unit 31 is able to send or receive various pieces of information to or from another device (for example, each of the terminals 20 or the like) via the input/output interface 33 and the communication network 10 by computing the loaded instructions and data.

Thus, in the first aspect, the server 30 is able to function as an application server by running the installed specific application. Thus, the server 30 is able to perform, for example, an operation to receive a speech signal of a user (together with a video signal when needed) from each terminal 20 via the communication network 10. The server 30 is able to perform, for example, an operation to stream the received speech signal (together with a video signal when needed) to each terminal 20 via the communication network 10. Alternatively, the server 30 is able to function as a web server by running the installed specific application. Thus, the server 30 is able to perform similar operations via a web page to be sent to each terminal 20.

In the second aspect, the server 30 is able to function as an application server by running the installed specific application. Thus, the server 30 is able to perform, for example, an operation to acquire a speech signal of a speech of a user in a studio or another location where the server 30 is installed. The server 30 is able to perform an operation to acquire a converter in accordance with the acquired speech signal. The server 30 is able to perform, for example, an operation to generate a speech signal converted by using the acquired converter. The server 30 is able to perform, for example, an operation to stream the generated speech signal (together with a video signal when needed) to each terminal 20 via the communication network 10. Alternatively, the server 30 is able to function as a web server by running the installed specific application. Thus, the server 30 is able to perform similar operations via a web page to be sent to each terminal 20.

In the third aspect, the server 30 is able to function as an application server by running the installed specific application. Thus, the server 30 is able to perform, for example, an operation to receive, from the studio unit 40 installed in a studio or another location, a speech signal of a user (together with a video signal when needed) in the studio or the like via the communication network 10. The server 30 is able to perform, for example, an operation to stream the received speech signal (together with a video signal when needed) to each terminal 20 via the communication network 10.

The server 30 may include one or more microprocessors, and/or a graphics processing unit (GPU) instead of the central processing unit 31 or in addition to the central processing unit 31. Alternatively, the server 30 is able to function as a web server by running the installed specific application. Thus, the server 30 is able to perform similar operations via a web page to be sent to each studio unit 40.

2-3. Hardware Configuration of Studio Unit 40

The studio unit 40 can be implemented by an information processing device, such as a personal computer. The studio unit 40, as well as the above-described terminal 20 and the server 30, may mainly include a central processing unit, a main storage, an input/output interface, an input device, an auxiliary storage, and an output device. These devices are connected by a data bus and/or a control bus.

The studio unit 40 is able to function as an information processing device by running the installed specific application. Thus, the studio unit 40 is able to perform, for example, an operation to acquire a speech signal of a speech of a user in a studio or another location where the studio unit 40 is installed. The studio unit 40 is able to perform, for example, an operation to acquire a converter in accordance with the acquired speech signal. The studio unit 40 is able to perform, for example, an operation to generate a speech signal converted by using the acquired converter. The studio unit 40 is able to perform, for example, an operation to send the generated speech signal (together with a video signal when needed) to the server 30 (for example, the server 30A) via the communication network 10. Alternatively, the studio unit 40 is able to open an installed web browser. Thus, the studio unit 40 is able to receive a web page from the server 30, display the web page, and perform similar operations.

3. Functions of Each Device

Next, an example of the functions of each of the terminal 20, the server 30, and the studio unit 40 will be described.

3-1. Functions of Terminal 20

Figure 3:
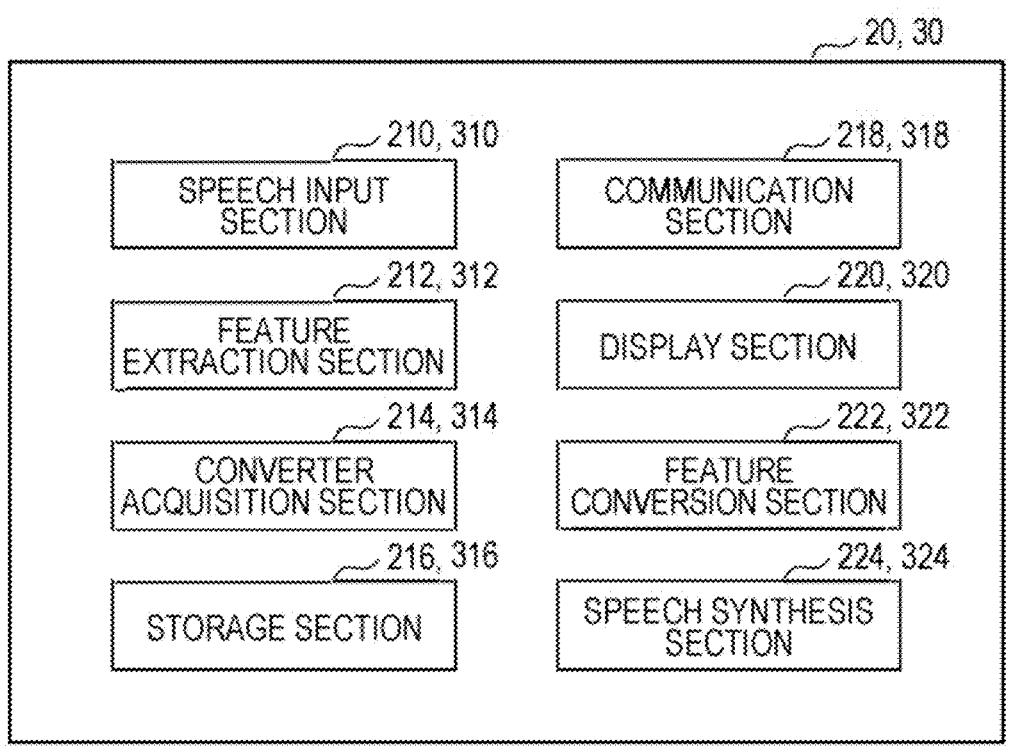
FIG. 3 is a schematic block diagram of a functional configuration of a terminal and server shown in FIG. 1.

An example of the functions of the terminal 20 will be described with reference to FIG. 3. FIG. 3 is a schematic block diagram of a functional configuration of a terminal and server shown in FIG. 1. Reference signs associated with the server 30 as will be described later are also shown in FIG. 3.

As shown in FIG. 3, the terminal 20 may mainly include a speech input section 210, a feature extraction section 212, a converter acquisition section 214, a storage section 216, a communication section 218, and a display section 220. The terminal 20 may further include a feature conversion section 222 and a speech synthesis section 224.

(1) Speech Input Section 210

The speech input section 210 inputs a speech signal of a speech of a user by using a microphone. As will be described later, the speech input section 210 is able to input, but not limited to, at least one of the following speech signals and the like.

Speech signal of a high-pitched speech of the user (first speech signal)

Speech signal of a low-pitched speech of the user (second speech signal)

Speech signal of a natural speech of the user (third speech signal)

Speech signal of a speech the user speaks in imitation of a desired person or character (fourth speech signal)

Speech signal of a normal speech of the user (fifth speech signal)

When the terminal 20 is a smartphone, a tablet, a laptop personal computer, or the like, the speech input section 210 is able to use a microphone incorporated in a main body as the above-described microphone.

(2) Feature Extraction Section 212

The feature extraction section 212 is able to perform, for example, a short time frame analysis of various speech signals input by the speech input section 210. Thus, the feature extraction section 212 is able to extract various features (speech features) in each time frame. In one embodiment, the feature extraction section 212 is able to extract at least one of the following features.

(i) Fundamental frequency indicating a voice pitch (ii) Plurality of frequency components emphasized by vocal tract resonance, for example, first formant (iii) Plurality of frequency components emphasized by vocal tract resonance, for example, second formant In another embodiment, the feature extraction section 212 is able to extract at least one of the following features.

(i) Fundamental frequency indicating a voice pitch (ii) Spectral envelope obtained by smoothing a spectrum and representing timbre (iii) Aperiodic indicator indicating influences of fluctuations of vocal cord vibration and inclusion of noise (3) Converter Acquisition Section 214

The converter acquisition section 214 is able to acquire one or a plurality of converters to be used by a user by using features extracted by the feature extraction section 212. Here, a converter may have parameters indicating how to convert at least one feature extracted from a speech signal (for example, fifth speech signal) of a speech of a user, which is a conversion object. Examples of the parameters may include a parameter indicating how much the fundamental frequency is increased or decreased and a parameter indicating a frequency range from which a first formant is shifted and a frequency range to which the first formant is shifted.

(4) Storage Section 216

The storage section 216 is able to store various pieces of information needed for the operation of the terminal 20. For example, the storage section 216 is able to store various applications including an audio/video streaming application, an audio/video viewing application, a web browser, and/or the like. The storage section 216 is able to store various pieces of information, signals, data, and the like needed for and/or generated by these applications.

(5) Communication Section 218

The communication section 218 is able to send or receive various pieces of information to or from the server 30 and the like via the communication network 10. Examples of the various pieces of information may include a parameter indicating how much the fundamental frequency is increased or decreased and a parameter indicating a frequency range from which a first formant is shifted and a frequency range to which the first formant is shifted.

(6) Display Section 220

The display section 220 is able to display various pieces of information to a user via a touch panel, a display, or the like. The various pieces of information can be information generated by running various applications including an audio/video streaming application, an audio/video viewing application, a web browser, and/or the like.

(7) Feature Conversion Section 222

The feature conversion section 222 is able to convert at least one feature extracted from a speech signal of a speech of a user by using a converter acquired by the converter acquisition section 214. The feature conversion section 222 is able to output the converted at least one feature to the speech synthesis section 224.

(8) Speech Synthesis Section 224

The speech synthesis section 224 is able to perform speech synthesis using the converted at least one feature. Thus, the speech synthesis section 224 is able to generate a speech signal processed from a speech of a user. For example, the speech synthesis section 224 is able to generate a speech signal processed from a speech of a user in accordance with the converted at least one feature with a vocoder.

The operations of the above-described sections can be performed by the user terminal 20 that runs a predetermined application (for example, an audio/video streaming application). The predetermined application is installed on the terminal 20 of the user.

3-2. Functions of Server 30

A specific example of the functions of the server 30 will be described also with reference to FIG. 3. For example, some of the above-described functions of the terminal 20 can be used as the functions of the server 30. Therefore, reference signs assigned to the components of the server 30 are also indicated in FIG. 3.

In the second aspect, the server 30 includes a speech input section 310, a feature extraction section 312, a converter acquisition section 314, a storage section 316, a communication section 318, a display section 320, a feature conversion section 322, and a speech synthesis section 324 that are respectively the same as the speech input section 210, the feature extraction section 212, the converter acquisition section 214, the storage section 216, the communication section 218, the display section 220, the feature conversion section 222, and the speech synthesis section 224 described in association with the terminal 20 except for differences described below.

In the second aspect, it may be assumed that the server 30 is placed in a studio or another location and used by a plurality of users. Therefore, the storage section 316 is able to store various pieces of information including an acquired converter and the like in association with each of the plurality of users.

A microphone used by the speech input section 310 or included in the speech input section 310 can be placed so as to face a user in a space where the user speaks in a studio or another location where the server 30 is installed. Similarly, a display, a touch panel, or the like that makes up the display section 320 can also be placed so as to face a user or near a user in a space where the user speaks.

The communication section 318 is able to send or receive various pieces of information to or from another server 30, each terminal 20, and/or the like via the communication network 10. The various pieces of information may include information needed and/or generated in acquiring a converter to be used for a speech signal of a speech of a user, a speech signal generated (processed) with an acquired converter from a speech signal of a speech of a user, and other information.

The communication section 318 is able to stream a file or the like, containing a speech signal and/or a video signal and stored in the storage section 316 in association with each user, to the plurality of terminals 20 via the communication network 10. Each of the plurality of terminals 20 is able to run the installed predetermined application (for example, an audio/video viewing application). Thus, each terminal 20 is able to send a signal (request signal) to request the server 30 to stream a desired video. Thus, each terminal 20 is able to receive a file or the like containing a desired speech signal and/or a video signal via the predetermined application from the server 30 in response to the signal.

Information (file or the like containing a speech signal and/or a video signal) stored in the storage section 316 may be stored in one or more other servers (storages) 30 that are able to communicate with the server 30 via the communication network 10.

On the other hand, in the first aspect, the speech input section 310, the feature extraction section 312, the converter acquisition section 314, the display section 320, the feature conversion section 322, and the speech synthesis section 324 used in the second aspect may be used as options. The communication section 318 is able to operate as described above and additionally cause the storage section 316 to store a file or the like containing a speech signal and/or a video signal sent from each terminal 20 and received from the communication network 10. The communication section 318 is able to stream the file or the like stored in the storage section 316 in this way to the plurality of terminals 20.

On the other hand, in the third aspect, the speech input section 310, the feature extraction section 312, the converter acquisition section 314, the display section 320, the feature conversion section 322, and the speech synthesis section 324 used in the second aspect may be used as options. The communication section 318 is able to operate as described above and additionally cause the storage section 316 to store a file or the like containing a speech signal and/or a video signal sent from the studio unit 40 and received from the communication network 10. The communication section 318 is able to stream the file or the like stored in the storage section 316 in this way to the plurality of terminals 20.

3-3. Functions of Studio Unit 40

The studio unit 40 may have a similar configuration to that of the terminal 20 or the server 30 shown in FIG. 3. Thus, the studio unit 40 is capable of performing similar operations to those of the terminal 20 or the server 30. The communication section 218 (318) is able to send a file or the like, containing a speech signal and/or a video signal and stored in the storage section 216 (316), to the server 30 via the communication network 10.

A microphone used by the speech input section 210 (310) or included in the speech input section 210 (310) can be placed so as to face a user in a space where the user speaks in a studio or another location where the studio unit 40 is installed. Similarly, a display, a touch panel, or the like that makes up the display section 220 (320) can also be placed so as to face a user or near a user in a space where the user speaks.

4. Operations of Communication System 1

Figure 4:
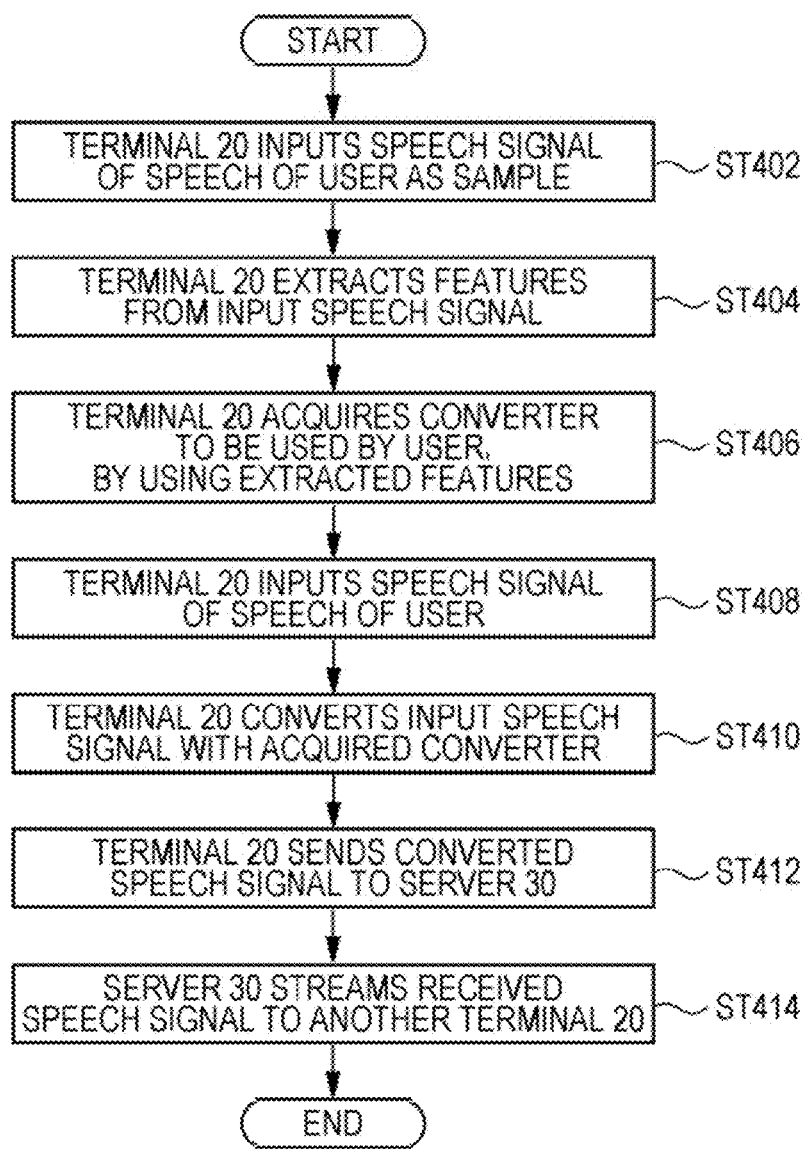
FIG. 4 is a flowchart of operations to be performed in the communication system shown in FIG. 1.

Next, a specific example of the operations of the communication system 1 having the above-described configuration will be described with reference to FIG. 4. FIG. 4 is a flowchart operations to be performed in the communication system 1 shown in FIG. 1. Here, the case where (i) fundamental frequency, (ii) first formant, and (iii) second formant are used as features will be specifically described.

Figure 5:
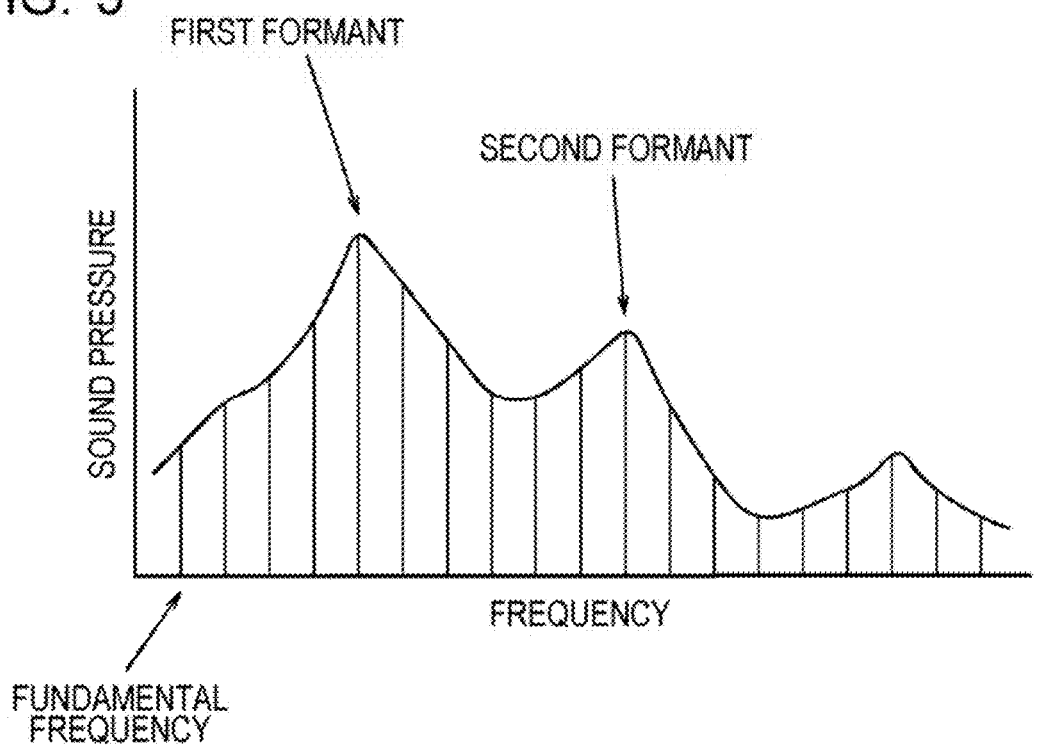
FIG. 5 is a graph of a relationship between fundamental frequency and formant in a frequency spectrum obtained from a speech signal of a speech of a human.

The vocal tract of a human may be regarded as a kind of filter that emphasizes specific frequency components by means of resonance. Frequency components emphasized by the resonance of the vocal tract are formants. There are an infinite number of formants. The formants are referred to as first formant, second formant, third formant, and the like in ascending order of frequency. As illustrated in FIG. 5, in a frequency spectrum, the first formant, the second formant, and the like sequentially appear following the fundamental frequency representing the pitch of a voice. In FIG. 5, the horizontal axis represents frequency ([Hz]), and the vertical axis represents sound pressure and amplitude ([dB]).

In step (hereinafter, abbreviated as ST) 402, the terminal 20 (specifically, the speech input section 210) inputs, for example, the following speech signals of four types from a user at different times as samples.

First sample: Speech signal of a high-pitched speech of the user (first speech signal)

Second sample: Speech signal of a low-pitched speech of the user (second speech signal)

Third sample: Speech signal of a natural speech of the user (third speech signal)

Fourth sample: Speech signal of a speech the user speaks in imitation of a desired person or character (fourth speech signal)

In one embodiment, the first speech signal to the fourth speech signal are WAV files.

As for the first sample, the user is able to read (speak) a script containing phonemes in natural language processing in a higher-pitched voice as much as possible. The terminal 20 is able to acquire such a speech as a first speech signal. Here, the terminal 20 is able to acquire a first speech signal of each of speeches the user individually speaks for, for example, five vowels at different times from one another. Specifically, for example, the user is able to speak "A" in a higher voice as much as possible only for a predetermined period of time (for example, five seconds) during which the character "A" is displayed on the display section 220 of the terminal 20. Subsequently, the user is able to speak "I" in a higher voice as much as possible only for a predetermined period of time (for example, five seconds) during which the character "I" is displayed on the display section 220. The same applies to the characters "U", "E", and "O". Thus, the terminal 20 is able to recognize which vowel is spoken and which time the vowel is spoken among the acquired first speech signals. The above-described five vowels are vowels in Japanese and are specifically "A", "I", "U", "E", and "O". In the following description, the example in which one embodiment adopts Japanese will be described. When a language other than Japanese is adopted, the number of vowels can change.

As for the second sample, the user is able to read, for example, the same script as the above-described script in a lower-pitched voice as much as possible. The terminal 20 is able to acquire such a speech as a second speech signal. The terminal 20 acquires a second speech signal of each of speeches the user individually speaks for, for example, five vowels at different times from one another as in the case of the above-described first speech signal.

As for the third sample, the user is able to read, for example, the same script as the above-described script as a natural conversation without any particular awareness. The terminal 20 is able to acquire such a speech as a third speech signal. The terminal 20 acquires a third speech signal of each of speeches the user individually speaks for, for example, five vowels at different times from one another as in the case of the above-described first speech signal.

As for the fourth sample, the user is able to read, for example, the same script as the above-described script in imitation of a desired person or character (while getting into such a person or character). The terminal 20 is able to acquire such a speech as a fourth speech signal. The terminal 20 acquires a fourth speech signal of each of speeches the user individually speaks for, for example, five vowels at different times from one another as in the case of the above-described first speech signal.

Scripts to be respectively used to acquire a first speech signal to a fourth speech signal can be the same as one another as described above or can be individually prepared for the speech signals.

Subsequently, in ST404, the terminal 20 (specifically, the feature extraction section 212) is able to extract features, that is, a fundamental frequency, a first formant, and a second formant, from each of the first speech signal to the fourth speech signal. Specifically, the terminal 20 is able to extract a fundamental frequency, a first formant, and a second formant by, for example, the following signal processing of each of the first speech signal to the fourth speech signal.

Emphasizing a high-frequency component of a waveform with a pre-emphasis filter

Acquiring an amplitude spectrum by multiplying a window function and then performing a first Fourier transform (FFT)

Compressing the amplitude spectrum by applying a mel filter bank to the amplitude spectrum Performing a discrete cosine transform on the assumption that the compressed numeric string is a signal In one embodiment, the terminal 20 may acquire the above-described features by, for example, using "openSMILE" and/or "LibROSA" that is a library prepared in Python that is a programming language.

Estimation of a fundamental frequency can be performed by using libraries illustrated below.

STRAIGHT <http://www.kki.yamanashi.ac.jp/~mmorise/straight/introductions.html>

WORLD <http://www.kki.yamanashi.ac.jp/~mmorise/world/int roductions.html>

REAPER <https://www.reaper.fm/download.php>

These web sites are incorporated herein by reference in their entirety.

Thus, in ST404, the terminal 20 is able to acquire a fundamental frequency, a first formant, and a second formant from each of the first speech signal to the fourth speech signal (for example, in association with each time frame). The terminal 20 is able to recognize which vowel the user has spoken and which time the user has spoken the vowel for each of the first speech signal to the fourth speech signal. Thus, the terminal 20 is able to acquire a fundamental frequency, a first formant, and a second formant from each of these five vowels for each of the first speech signal to the fourth speech signal.

Subsequently, in ST406, the terminal 20 (specifically, the converter acquisition section 214) acquires a converter to be used by the user by using the features extracted in ST404. Here, the converter is capable of mapping a fundamental frequency Fi0, a first formant Fi1, and a second formant Fi2, in a speech signal of a speech of the user, respectively to intended converted fundamental frequency FO0, first formant FO1, and second formant FO2. In other words, the converter may have at least one of the following parameters and the like.

Figure 6:
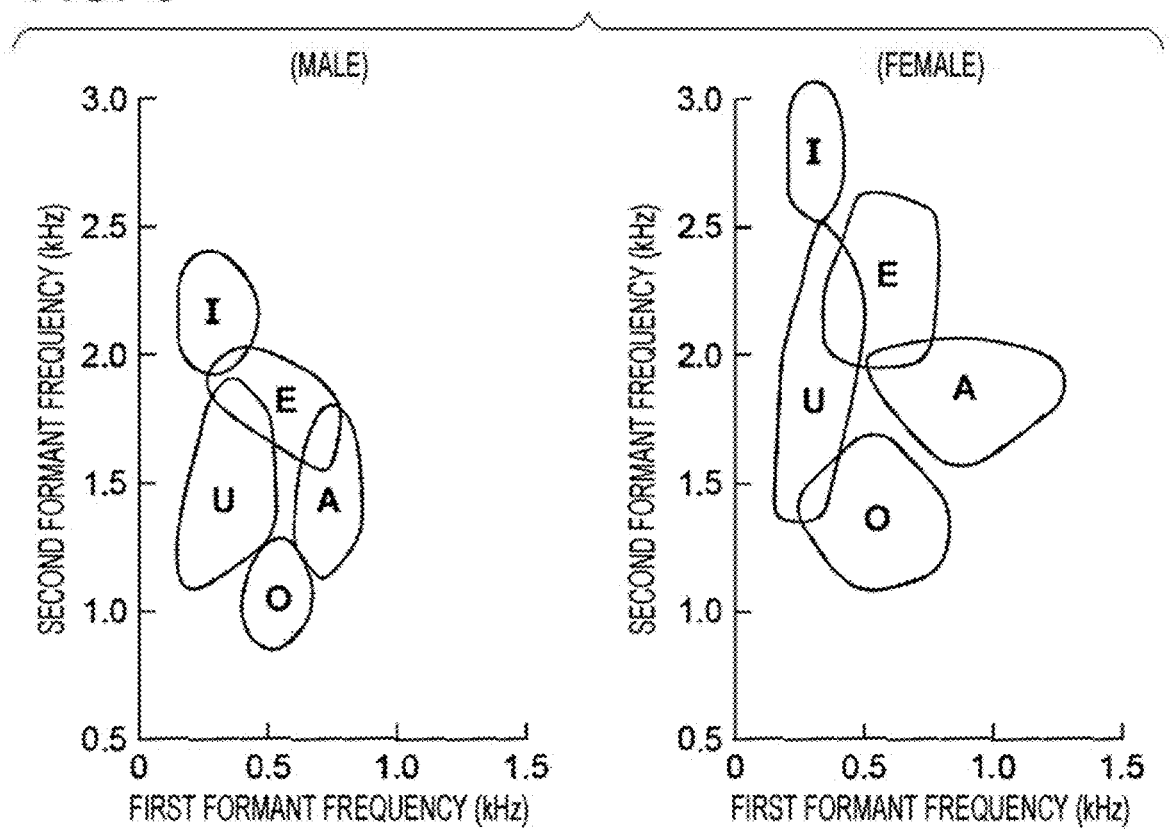
FIG. 6 is a conceptual schematic view of shifting a first formant and a second formant in a speech signal of a speech of a user with a converter.

Parameter indicating a frequency to which the fundamental frequency in a speech signal of a speech of the user is shifted Parameter indicating a frequency from which the first formant is shifted and a frequency to which the first formant is shifted Parameter indicating a frequency from which the second formant is shifted and a frequency to which the second formant is shifted Shifting the fundamental frequency to another frequency may be regarded as raising or lowering the pitch of the voice of the user. Shifting the first formant and the second formant may be regarded as, for example, converting a male voice having (the range of) a lower first formant and (the range of) a lower second formant for each vowel to a female voice having (the range of) a higher first formant and (the range of) a higher second formant for each vowel (or in the reverse direction) as illustrated in FIG. 6. In FIG. 6, the horizontal axis represents first formant, and the vertical axis represents second formant.

Figure 7:
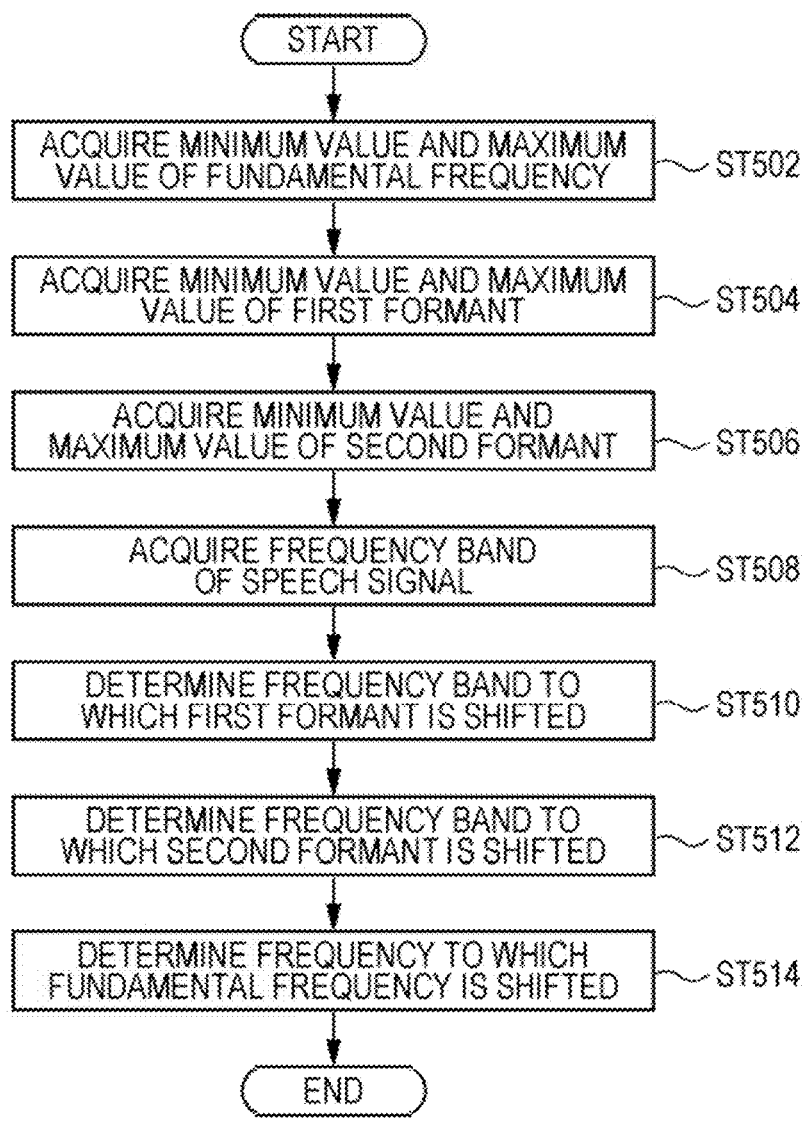
FIG. 7 is a flowchart of processing to be performed in step 406 shown in FIG. 4.

The terminal 20 is able to perform the following processing in one embodiment to acquire a converter to be used by the user. Such processing will be described with reference to FIG. 7. FIG. 7 is a flowchart of processing to be performed in ST406 shown in FIG. 4.

In ST502, the terminal 20 (specifically, the converter acquisition section 214) is able to acquire a minimum value and a maximum value of the fundamental frequency in the speech signals of the speeches of the user. The minimum value of the fundamental frequency is obtained by searching the fundamental frequencies obtained from the second speech signals in ST404 for a minimum value. The maximum value of the fundamental frequency is obtained by searching the fundamental frequencies obtained from the first speech signals in ST404 for a maximum value.

In ST504, the terminal 20 is able to acquire a minimum value and a maximum value of the first formant in the speech signals of the speeches of the user for each of the vowels "A", "I", "U", "E", and "O". The minimum value of the first formant is obtained by searching the first formants obtained from the second speech signals in ST404 for a minimum value. The maximum value of the first formant is obtained by searching the first formants obtained from the first speech signals in ST404 for a maximum value. Thus, the terminal 20 is able to recognize the minimum value and the maximum value of the first formant for each of the vowels "A", "I", "U", "E", and "O". In other words, when the first formant obtained from the speech signal of the speech of the user falls between the minimum value and the maximum value, obtained for, for example, the vowel "A", the terminal 20 estimates that the user has spoken the vowel "A" at that time.

In ST504, the terminal 20 is able to acquire a maximum value and a minimum value from among the first formants obtained for five vowels from the fourth speech signals in ST404.

In ST506, the terminal 20 is able to acquire a minimum value and a maximum value of the second formant in the speech signals of the speeches of the user for each of the vowels "A", "I", "U", "E", and "O". The minimum value of the second formant is obtained by searching the second formants obtained from the second speech signals in ST404 for a minimum value. The maximum value of the second formant is obtained by searching the second formants obtained from the first speech signals in ST404 for a maximum value. Thus, the terminal 20 is able to recognize the minimum value and the maximum value of the second formant for each of the vowels "A", "I", "U", "E", and "O". In other words, when the second formant obtained from the speech signal of the speech of the user falls between the minimum value and the maximum value, obtained for, for example, the vowel "A", the terminal 20 estimates that the user has spoken the vowel "A" at that time.

In ST506, the terminal 20 is able to acquire a maximum value and a minimum value from among the second formants obtained for five vowels from the fourth speech signals in ST404.

In ST508, the terminal 20 acquires a frequency band of the speech signal input from the speech input section 210. Specifically, the terminal 20 is able to, for example, acquire a frequency band (the minimum value and the maximum value of a frequency component that appears in a frequency spectrum) of each of the first speech signal to the fourth speech signal. The terminal 20 is able to acquire a minimum one (or a maximum one) of the minimum values (or the maximum values) calculated for each of the first speech signal to the fourth speech signal as a final minimum value (or a final maximum value).

ST502 to ST508 can be performed in a selected order.

In ST510, the terminal 20 determines a frequency from which the first formant is shifted and a frequency to which the first formant is shifted. Specifically, the terminal 20 is able to use, for example, the minimum value (input minimum value) and the maximum value (input maximum value) of the first formants acquired for each of the five vowels in ST504 and the minimum value (output minimum value) and the maximum value (output maximum value) of the first formants extracted for each of the five vowels from the fourth speech signals in ST504. By using these values, the terminal 20 is able to determine a parameter (first parameter) indicating to shift the first formant between the input minimum value and the input maximum value in the speech signal (fifth speech signal) of the speech of the user to a predetermined value between the output minimum value and the output maximum value for each of the five vowels.

Thus, the terminal 20 is able to determine a parameter (first parameter) indicating a frequency from which the first formant is shifted and a frequency to which the first formant is shifted and included in the converter.

In ST512, the terminal 20 determines a frequency from which the second formant is shifted and a frequency to which the second formant is shifted. Specifically, the terminal 20 is able to use, for example, the minimum value (input minimum value) and the maximum value (input maximum value) of the second formants acquired for each of the five vowels in ST506, and the minimum value (output minimum value) and the maximum value (output maximum value) of the second formants extracted for each of the five vowels from the fourth speech signals in ST506. By using these values, the terminal 20 is able to determine a parameter (second parameter) indicating to shift the second formant between the input minimum value and the input maximum value in the speech signal (fifth speech signal) of the speech of the user to a predetermined value between the output minimum value and the output maximum value for each of the five vowels.

Thus, the terminal 20 is able to determine a parameter (second parameter) indicating a frequency from which the second formant is shifted and a frequency to which the second formant is shifted and included in the converter.

In ST514, the terminal 20 determines a frequency to which the fundamental frequency is shifted. The terminal 20 is able to, for example, use a difference between the fundamental frequency acquired for the third speech signal in ST404 and the fundamental frequency acquired for the fourth speech signal in ST404 (or a value obtained by multiplying the difference by a predetermined coefficient). The terminal 20 is able to determine a parameter (third parameter) indicating to shift the fundamental frequency (input fundamental frequency) of the speech signal (fifth speech signal) of the speech of the user to a fundamental frequency (output fundamental frequency) obtained by adding the difference (or the value obtained by multiplying the difference by the predetermined coefficient) to the input fundamental frequency.

Thus, the terminal 20 is able to determine a parameter (third parameter) indicating a frequency to which the fundamental frequency is shifted and included in the converter.

In this way, the converter having the first parameter to the third parameter can be acquired. ST510 to ST514 can be performed in a selected order.

Referring back to FIG. 4, in ST406, the terminal 20 has acquired the converter to be used by the user. Thus, the terminal 20 is able to subsequently convert (process) the speech signal (fifth speech signal) of the speech of the user by using the converter acquired in this way.

In ST408 shown in FIG. 4, the terminal 20 (specifically, the speech input section 210) is able to input the speech signal (fifth speech signal) of the speech of the user. For example, the user is able to speak contents (reading of a dialogue, acting, or the like) intended to be streamed to other terminals 20 by uploading the contents onto the server 30 or the like. The terminal 20 is able to input the speech signal (fifth speech signal) of the speech of the user. The fifth speech signal is a WAV file in one embodiment.

In ST410, the speech signal (fifth speech signal) input in ST408 can be converted by the converter acquired in ST406.

Specifically, the terminal 20 (specifically, the feature extraction section 212) is able to extract features (here, a fundamental frequency, a first formant, and a second formant) from the fifth speech signal by means of a similar technique to that described in ST404. Here, the terminal 20 (specifically, the feature extraction section 212) is able to perform the following operation at the time of performing a fast Fourier transform and a discrete cosine transform as described in ST404. In other words, the terminal 20 is able to increase the number of bits to be allocated to part of the fifth speech signal, included in the frequency band (frequency range) acquired in ST508, as compared to the number of bits to be allocated to the other part of the fifth speech signal, not included in the frequency band (frequency range). Thus, high quality and cost reduction for such signal processing are achieved.

The terminal 20 (specifically, the feature conversion section 222) is able to convert the thus extracted features with the converter acquired in ST406. Specifically, when, for example, a first formant is focused, the first formant to be obtained from the fifth speech signal changes according to the vowel the user speaks. Thus, the terminal 20 is able to detect, in accordance with the first parameter included in the converter (see ST510), that the first formant obtained from the fifth speech signal falls between the input minimum value and the input maximum value determined for one of the five vowels. In this case, the terminal 20 (specifically, the feature conversion section 222) is able to shift the first formant to a predetermined value between the output minimum value and the output maximum value, determined for the one of the five vowels.

Similarly, when a second formant is focused, the second formant to be obtained from the fifth speech signal also changes according to the vowel the user speaks. Thus, the terminal 20 is able to detect, in accordance with the second parameter included in the converter (see ST512), that the second formant obtained from the fifth speech signal falls between the input minimum value and the input maximum value determined for one of the five vowels. In this case, the terminal 20 (specifically, the feature conversion section 222) is able to shift the second formant to a predetermined value between the output minimum value and the output maximum value, determined for the one of the five vowels.

When a fundamental frequency is focused, the terminal 20 (specifically, the feature conversion section 222) is able to shift the fundamental frequency (input fundamental frequency) to be obtained from the fifth speech signal to a value indicated by the third parameter (see ST514) of the converter (output fundamental frequency).

In this way, the terminal 20 (specifically, the feature conversion section 222) is able to perform the following operations even at the time of converting features. In other words, the terminal 20 is able to increase the number of bits to be allocated to part of the fifth speech signal, included in the frequency band (frequency range) acquired in ST508 as compared to the number of bits to be allocated to the other part of the fifth speech signal, not included in the frequency band (frequency range). Thus, high quality and cost reduction for such signal processing are achieved.

The terminal 20 (specifically, the speech synthesis section 224) is able to perform speech synthesis using features converted by the feature conversion section 222 (converted fundamental frequency, first formant, and second formant). Thus, the terminal 20 is able to generate a speech signal (output speech signal) processed from the fifth speech signal. Synthesizing a speech by using the converted features (for example, the converted fundamental frequency, first formant, and second formant) can be performed by using various known techniques.

In one embodiment, after the speech input section 210 completes input of the speech signal of the speech of the user (fifth speech signal) in ST408, the feature extraction section 212, the feature conversion section 222, and the speech synthesis section 224 are able to operate as described above in ST410. In this way, the terminal 20 is also capable of generating an output speech signal. In another embodiment, the feature extraction section 212, the feature conversion section 222, and the speech synthesis section 224 are able to operate as described above in ST410, while the speech input section 210 is able to continuously input a speech signal of a speech of the user (fifth speech signal) in ST408. In other words, the speech input section 210 is able to continuously input a speech signal of a speech of the user (fifth speech signal) in ST408, while the feature extraction section 212, the feature conversion section 222, and the speech synthesis section 224 are able to operate as described above in ST410. In this way, the terminal 20 is also capable of continuously generating an output speech signal. In other words, in the terminal 20, the speech input section 210, the feature extraction section 212, the feature conversion section 222, and the speech synthesis section 224 are able to perform real-time processing.

In ST412, the terminal 20 (specifically, the communication section 218) is able to send the generated output speech signal to the server 30. Sending the output speech signal by the communication section 218 can also be performed in parallel with the operations of the speech input section 210, the feature extraction section 212, the feature conversion section 222, and the speech synthesis section 224. In one embodiment, the terminal 20 (specifically, the communication section 218) may send the converter acquired in ST406 (at least one of the first parameter to the third parameter included in the converter) to the server 30 at any timing so that the converter is available to other users.

After ST412 or in parallel with ST412, the server 30 having received the output speech signal from the terminal 20 is able to stream the received output speech signal to one or more of the other terminals 20. Users of the one or more of the other terminals 20 are able to, after listening to the streamed output speech signal, send messages and the like containing impressions, comments, or the like to the user of the terminal 20 that is the source of the output speech signal via the server 30 or directly as feedback.

In the above-described embodiment, the case where the terminal 20 performs all the processing corresponding to ST502 to ST514 shown in FIG. 7 is described with reference to FIG. 4 and FIG. 7. However, in another embodiment, the terminal 20 is able to perform part of processing, corresponding to ST502 to ST508, and the server 30 is able to perform the other part of processing, corresponding to ST510 to ST514, and send information about the obtained converter to the terminal 20. In further another embodiment, the server 30 is able to perform all the processing corresponding to ST502 to ST514 and send information about the obtained converter to the terminal 20. In any case, the terminal 20 needs to send necessary information to the server 30 before the server 30 performs processing.

The operations described above with reference to FIG. 4 and FIG. 7 can be performed not only by the terminal 20 but also by the server 30 or the studio unit 40 having a configuration for performing similar operations (the configuration described with reference to FIG. 2 and FIG. 3). This also similarly applies to various embodiments that will be described below.

In the embodiment described with reference to FIG. 4 and FIG. 7, the case where, in ST410, the terminal 20 converts all the plurality of features acquired in ST404 from the speech signal input in ST408 (fifth speech signal) is described. Here, the plurality of features acquired in ST404 may include a fundamental frequency, a first formant, and a second formant in one embodiment and may include a fundamental frequency, a spectral envelope, and an aperiodic indicator as will be described later in another embodiment. However, in another embodiment, in ST410, the terminal 20 may convert only one or two of the plurality of features acquired in ST404 from the speech signal input in ST408 (fifth speech signal). In this case, the terminal 20 is able to generate an output speech signal by performing speech synthesis signal processing using one (or two) converted feature and two (or one) unconverted features.

5. Modifications 5-1. Another Method of Acquiring Converter (Part 1)

Figure 8:
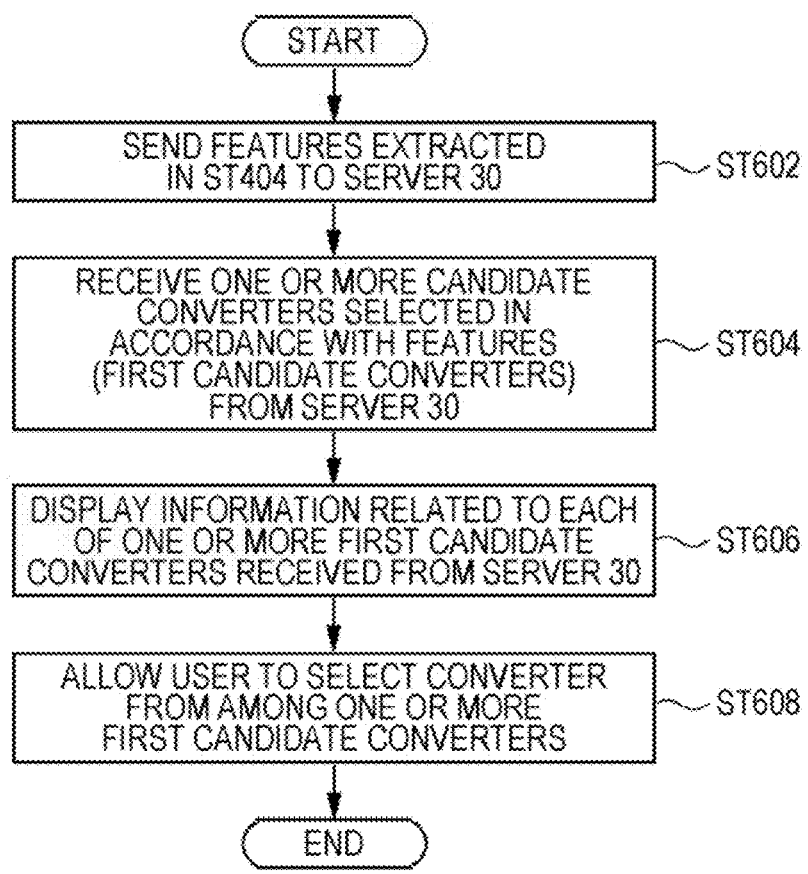
FIG. 8 is a flowchart of another processing to be performed in step 406 shown in FIG. 4.

Another method of acquiring the converter described with reference to FIG. 4 and FIG. 7 will be described with reference to FIG. 8. FIG. 8 is a flowchart of another processing to be performed in ST406 shown in FIG. 4. An embodiment that will be described below with reference to FIG. 8 and the like can be performed independently or in combination with the above-described embodiment with reference to FIG. 7 and the like.

In ST602, the terminal 20 (specifically, the communication section 218) is able to send the feature extracted in ST404 (see FIG. 4) to the server 30. Specifically, the terminal 20 is able to, for example, send at least one of the plurality of features (fundamental frequency, first formant, and second formant) extracted from at least one of the first speech signal to the fourth speech signal to the server 30. In this sense, the terminal 20 just needs to send at least one feature to the server 30, so the terminal 20 may input at least one speech signal as a sample in ST402. The terminal 20 just needs to extract at least one feature also in ST404.

The server 30 having received such a feature stores a plurality of converters in advance. The plurality of converters may include a plurality of converters generated by a plurality of terminals 20 and received via the communication network 10 and/or a plurality of converters generated by an expert or an engineer. Each of the plurality of converters may include the above-described first parameter to third parameter. The server 30 is able to store information about each of a plurality of converters (for example, information indicating that a speech generated by the converter imitates the voice of a person or character, an image corresponding to the person or character, and the like) in association with the converter. At least some of the plurality of converters stored in advance in the server 30 can be generated in accordance with at least one of the various embodiments described in the specification.

The server 30 is able to extract one or more first candidate converters approximate or equal to at least one of at least one feature received from the terminal 20 in ST602 from among the plurality of converters.

Specifically, for the first formant, the server 30 may extract, from among a plurality of converters, one or more first candidate converters having a first parameter such that, for example, the first formant received from the terminal 20 falls between the input minimum value and the input maximum value. For the second formant, similarly, the server 30 may extract one or more first candidate converters having a second parameter such that, for example, the second formant received from the terminal 20 falls between the input minimum value and the input maximum value. For the fundamental frequency, similarly, the server 30 may extract one or more first candidate converters having a third parameter including, for example, an input fundamental frequency approximate or equal to the fundamental frequency received from the terminal 20.

The server 30 is able to send back (the first parameter to the third parameter of each of) the extracted one or more first candidate converters and information about each first candidate converter to the terminal 20. The information about each first candidate converter may include, for example, information indicating that a speech generated by the converter imitates the voice of a person or character, an image corresponding to the person or character, and the like. Thus, in ST604, the terminal 20 is able to receive one or more first candidate converters and information about each first candidate converter from the server 30.

Figure 9:
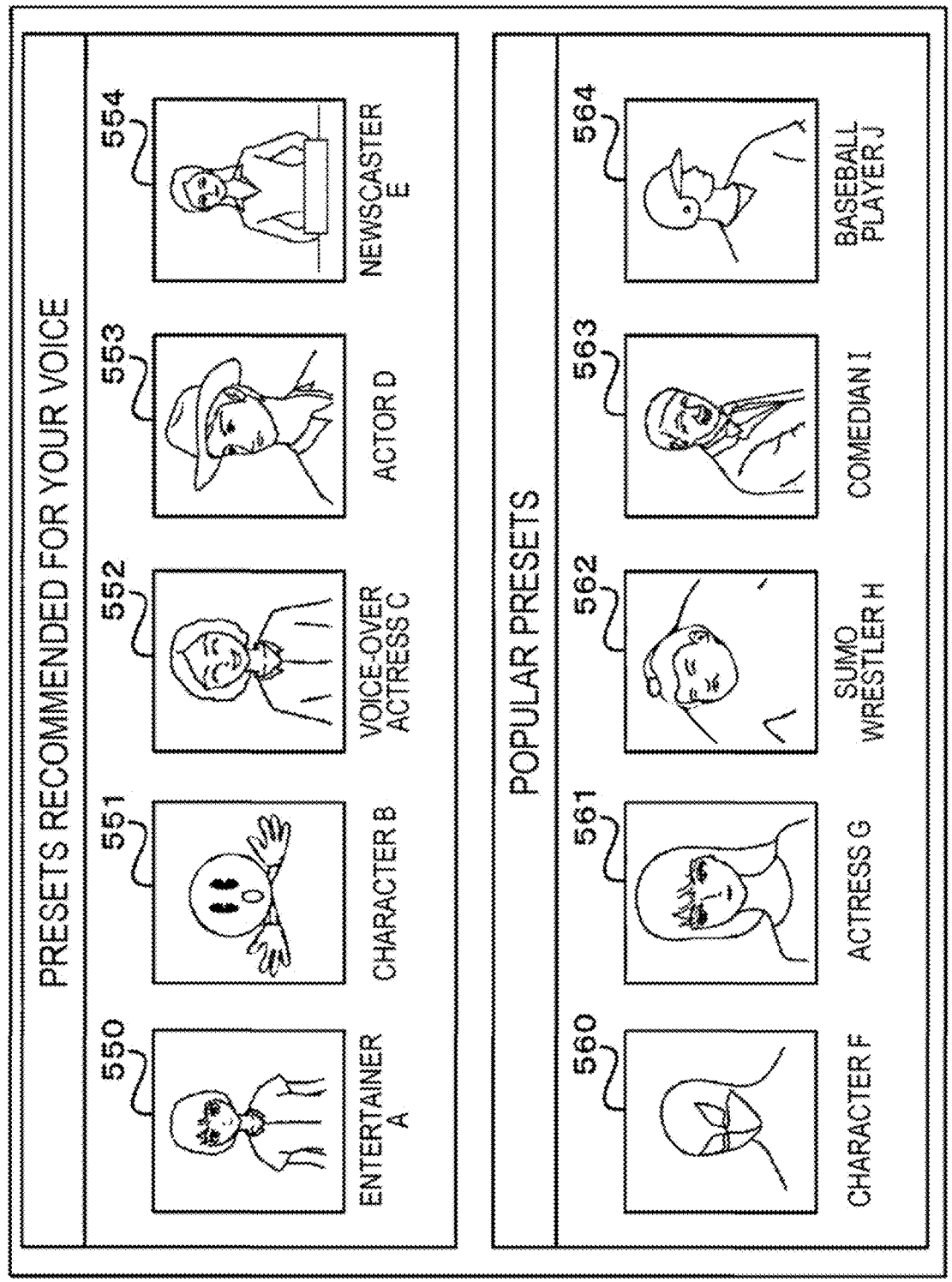
FIG. 9 is a schematic diagram of a screen to be displayed on the terminal that performs the process shown in FIG. 8.

In ST606, the terminal 20 is able to present the one or more first candidate converters received from the server 30 to the user of the terminal 20 as objects to be recommended. Specifically, as illustrated in FIG. 9, the terminal 20 is able to present, for example, five converters 550 to 554 as the one or more first candidate converters received from the server 30. In this case, the terminal 20 is able to display information related to each converter (for example, an image corresponding to the converter, the name of a person or character corresponding to the converter, and the like).

In ST608, the terminal 20 allows the user to select a desired converter from among the displayed one or more first candidate converters 550 to 554. The converter selected by the user accordingly can be used thereafter as the converter acquired by the terminal 20.

In another embodiment, in ST604, the server 30 is able to extract one or more converters (second candidate converters) popular among users of a plurality of terminals 20 regardless of the features received from the terminal 20 in ST602. In an exemplary implementation, the one or more converters are popular because they are selected and used by other devices at a high rate, e.g. in the past hour, day, week, month, year, all time, etc., and/or in high total usage count.

The server 30 is able to send (the first parameter to the third parameter of each of) the extracted one or more second candidate converters and information about each second candidate converter to the terminal 20. Such one or more second candidate converters and information about each second candidate converter can be sent by the server 30 to the terminal 20 together with information about the one or more first candidate converters or separately from information about the one or more first candidate converters. Here, the information about each second candidate converter may include, for example, information indicating that a speech generated by the converter imitates the voice of a person or character, an image corresponding to the person or character, information based on more abstract features, such as a sexy type and a laid-back type, and other information.

The server 30 is able to, for each user, extract one or more converters (second candidate converters) associated with an avatar (character) selected by the user from among a plurality of converters (for example, a plurality of converters popular among users of a plurality of terminals 20) regardless of the features received from the terminal 20 in ST602. The server 30 may send (the first parameter to the third parameter of each of) the extracted one or more second candidate converters and information about each second candidate converter to the terminal 20 together with information about the one or more first candidate converters or separately from information about the one or more first candidate converters. The information about each second candidate converter may include, for example, information indicating that a speech generated by the converter imitates the voice of a person or character, an image corresponding to the person or character, information based on more abstract features, such as a sexy type and a laid-back type, and other information. In this case, the one or more converters associated with the avatar (character) selected by the user may be one or more converters (second candidate converters) that have been selected before by another user who selects the avatar or the like or parts included in the avatar. Here, the parts can include eyes, eyebrows, mouth, and/or the like. For example, for a user U1 who selects an avatar A1, the server 30 may extract one or more converters (second candidate converters) that have been selected before by another user U2 who selects the avatar A1 and/or parts included in the avatar A1. To implement such operations, the server 30 is able to store, for example, at least one of the following pieces of information in association with each user.

Information identifying each avatar selected by the user
Information identifying each part selected by the user
Information identifying each part included in an avatar selected by the user The one or more second candidate converters may also include a plurality of converters generated by a plurality of terminals 20 and received via the communication network 10 and/or a plurality of converters generated by an expert or an engineer. Each of these second candidate converters may also have the above-described first parameter to third parameter. At least some of the plurality of converters stored in advance in the server 30 can be generated in accordance with at least one of the various embodiments described in the specification.

In this case, in ST606, the terminal 20 is able to present the one or more second candidate converters received from the server 30 to the user of the terminal 20 as objects to be recommended together with the above-described one or more first candidate converters. Specifically, as illustrated in FIG. 9, the terminal 20 is able to present, for example, five converters 560 to 564 as the one or more second candidate converters received from the server 30. In this case, the terminal 20 is able to display information related to each converter (for example, an image corresponding to the converter, the name of a person or character corresponding to the converter, and the like). In ST608, in the terminal 20, the converter selected by the user from among the displayed one or more second candidate converters 560 to 564 may be used thereafter as the converter acquired by the terminal 20.

In the example described above in relation to FIG. 8 and FIG. 9, the case where the terminal 20 receives information about one or more first candidate converters (and one or more second candidate converters) from the server 30 is described. However, the terminal 20 is able to receive information about a plurality of converters from the server 30 and store the information in advance. The terminal 20 may extract one or more first candidate converters from among the stored plurality of converters by using at least one of the plurality of features extracted in ST404 with a similar technique to that of the server 30 or may extract one or more popular converters as one or more second candidate converters.

In the embodiment described above with reference to FIG. 8, in ST606, the terminal 20 is able to display information about the one or more first candidate converters and/or information about the one or more second candidate converters, received from the server 30, as objects to be recommended. In ST608, the terminal 20 is able to select any one of converters from among the one or more first candidate converters and/or the one or more second candidate converters. In this case, the terminal 20 is able to provide via a user interface a function of, before the user formally selects any one of converters, allowing the user to try listening to a voice converted from the voice of the user by each of the one or more first candidate converters and/or the one or more second candidate converters. In this case, the terminal 20 of the user is able to convert an input speech signal (fifth speech signal) and generate an output speech signal by performing similar processing to that in ST410 with the converter selected by the user to try listening to. The generated output speech signal may be output from a speaker mounted on the terminal 20, a speaker and/or a headphone connected to the terminal 20, or other output devices.

5-2. Another Method of Extracting First Candidate Converter

In the embodiment described above in relation to FIG. 8, the case where, in ST604, the server 30 extracts one or more first candidate converters from among a plurality of converters in accordance with the features received from the terminal 20 is described. In this case, the server 30 may extract one or more first candidate converters from among a plurality of converters further in accordance with user's emotion and/or personality estimated from the speech signal (fifth speech signal) of the speech of the user.

Specifically, the terminal 20 is able to calculate a first formant, a second formant, and loudness from the fifth speech signal. Here, loudness is a sound pressure, that is, a root mean square value of a volume and can be acquired with, for example, openSMILE prepared in the above-described Python. The terminal 20 is able to estimate user's emotion (for example, angry, smiling, crying, or the like) and/or user's personality (for example, shy, lively, nervous, or the like) from these pieces of information to a certain extent. For example, the terminal 20 is able to store in advance information about emotion and/or personality as a look-up table in association with a combination of a vowel and a sound pressure the user speaks. The vowel can be estimated from a first formant and a second formant. The sound pressure can be estimated from loudness. The terminal 20 is able to acquire information about emotion and/or personality from the look-up table on a combination of first formant, second formant, and loudness, obtained from the fifth speech signal, as a search key.

The terminal 20 is able to send information about emotion and/or personality to the server 30 together with features in ST602 (see FIG. 8). Thus, the server 30 is able to extract one or more first candidate converters additionally in accordance with information about emotion and/or personality in ST604. For example, the server 30 is able to extract one or more candidate converters extracted in accordance with information about emotion and/or personality from among one or more first candidate converters acquired by the above-described technique in ST604 as new one or more first candidate converters. Specifically, for a user estimated to be quiet (or lively), the server 30 is able to extract one or more first candidate converters to convert the voice to a lively voice (or a quiet voice). For a user estimated to be angry (or crying), the server 30 is able to extract one or more first candidate converters to convert the voice to a crying voice (or an angry voice).

5-3. Another Method of Acquiring Converter (Part 2)

In the embodiment described with reference to FIG. 7, the terminal 20 calculates a first parameter to a third parameter respectively in ST510 to ST514. Alternatively, the terminal 20 may acquire a first parameter to a third parameter by using machine learning respectively in ST510 to ST514. Hereinafter, a specific example of this configuration will be described.

(1) Preface

In the above-described various embodiments, the case where a fundamental frequency, a first formant, and a second formant are used as a plurality of features is described. However, as will be described later, for example, a fundamental frequency, a spectral envelope, and an aperiodic indicator may be used as a plurality of features. In this case, MFCC, linear frequency band, or the like may be used as a method of getting a spectral envelope. One that is obtained by computing the logarithm of an amplitude spectrum (speech signal→Fourier transform→absolute value) and further performing a Fourier transform on the logarithm of the amplitude spectrum again (spectrum of a spectrum) is called cepstrum.

In the above-described embodiment, a fundamental frequency, a first formant, and a second formant are used as a plurality of features. Thus, these three features can be acquired by acquiring three peaks of the spectral envelope from the lower frequency side.

A technique to get a model with the above-described artificial knowledge is traditional speech signal processing. In statistical signal processing and a recent method using deep learning that is an extension of the statistical signal processing, it is characteristic and advantageous that no artificial feature needs to be described. The above-described embodiment is based on an artificial speech models for vowels and the like. Hereinafter, the case where statistical speech signal processing is used will be described together with a basic description of statistical speech signal processing.

(2) Features of Speech

Features in basic speech signal processing are organized.

A speech is made up of (i) vocal cord vibration that gives a fundamental period and (ii) nasal cavity and vocal tract resonance that gives the timbre of the speech.

Phonemes called vowels, nasal vowels, and consonants can be dissected into a plurality of vocalization structures including vocal tract, nasal cavity, and mouth radiation (different from linguistic structures). The spectral structure of speech is formed by synthesized waves. When the spectral structure of speech is analyzed, it is known that the spectral structure of speech is a synthesis of a spectral fine structure due to vocal cord vibration (which can be expressed by using a fundamental frequency) and a spectral envelope structure that can be expressed by resonance peaks due to the shape of nasal cavity and the shape of vocal tract. A frequency spectrum only expresses frequencies in a time frame, so a spectrogram is the one that has the horizontal axis representing time to visualize a time change.

When feature sequence X is referred to as a term for statistical speech signal processing, features are obtained in the form of sequence of numbers by using linear predictive coding (LPC) or mel frequency cepstral coefficients (MFCC). The contents of the features are treated abstractly. MFCC enable compression by using the characteristics of the way a sound is heard.

(3) MFCC Extraction Procedure

There are some techniques to obtain a spectral envelope (because, in short, the schematic shape of waves just needs to be expressed). For example, a spectral envelope can be obtained by performing an FFT on the value of Cepstrum, cutting the high frequencies, and then returning the resulting value into amplitude.

The MFCC extraction procedure often used in statistical speech signal processing may include the following steps.

(i) Emphasizing a high-frequency component of a waveform with a pre-emphasis filter (ii) Obtaining an amplitude spectrum by multiplying a window function and then performing a FFT (iii) Compressing the amplitude spectrum by applying a mel filter bank to the amplitude spectrum (iv) Performing a discrete cosine transform on the assumption that the compressed numeric string is a signal (v) Extracting lower-order components of the obtained cepstrum as MFCC A mel filter bank can be generated by arranging triangular bandpass filters overlappingly. The number of triangular bandpass filters is referred to as the number of channels. Here, it is characteristic that not just a filter bank but a filter bank is prefixed with mel. A mel scale is a frequency axis reflecting human speech perception, and the unit is mel. The mel scale is such that the interval reduces toward lower frequencies and the interval increases toward higher frequencies (such characteristics that a human is easier to perceive a small difference in the pitch of tone at lower frequencies and is more difficult to perceive a difference in the pitch of tone at higher frequencies are used). A function to interconvert Hz and mel to each other can be reversibly implemented by using log, exp, and coefficients as follows.

def hz2mel(f):
"Convert Hz to mel"

return1127.01048*np. log(f/700.0+1.0)

def mel2 hz(m):
"Convert mel to hz"

return700.0*(np. exp(m/1127.01048)−1.0)

In a mel filter bank, the triangular windows of the bandpass filters are arranged at equal intervals on the mel scale. When the filters arranged at equal intervals on the mel scale are returned to Hz scale, the filters have triangular shapes of which the width increases toward higher frequencies. By applying a mel filter bank, a schematic shape can be obtained with reduced workload. Because a DCT is performed in the later step, the result to be obtained is the same.

(4) Method Using GMM

There is a technique to obtain a spectral envelope by using GMM for an input speech as an existing method using learning in statistical speech signal processing. This technique has been researched for over 20 years, and, hereinafter, a specific technique for applying this technique to the present application will be described.

Regardless of what is selected for input and output domains, the technique described in Literature A (Tomoki Toda, Alan W. Black, Keiichi Tokuda. Voice Conversion Based on Maximum-Likelihood Estimation of Spectral Parameter Trajectory. IEEE TRANSACTIONS ON AUDIO, SPEECH, AND LANGUAGE PROCESSING, VOL. 15, NO. 8, NOVEMBER 2007<https://www.cs.cmu.edu/~pmuthuku/mlsp_page/lectures/Tod a_VC.pdf>) is used. Hereinafter, the outline of the technique will be described. Literature A is incorporated herein by reference in its entirety.

Variables [X,Y] combining a conversion source variable X (in this case, manually designed acoustic features, that is, a spectral envelope, is acquired by using MFCC or the like as a technique; specifically, an array of double or float values storing the logarithms of values obtained by performing a FFT on frequencies) and an associated conversion target variable Y (in this case, an intended conversion target spectral envelope) are subjected to fuzzy clustering using a Gaussian mixture model (GMM), and the model parameters are held. Thus, a joint probability density P(X,Y) of X and Y is estimated.

A pair of associated variables is obtained by performing time matching through dynamic programming on speeches for the same contents between a conversion source and a conversion target (parallel corpus). At the time of conversion, by using the parameters, argmax_Y P(Y|X) that is a maximum likelihood estimate of a conversion target variable Y is output under the condition that only a conversion source variable X is known.

(5) Method Using Hidden Markov Model (HMM)-DNN

In the case of the above (4), GMM is used as a model of a converter. In a method using learning, simpler implementation is conceivable by using approximation of function obtained through neural network instead of GMM. Acoustic feature is made up of multilayer physical features. Thus, by using hidden layers of a neural network, that is, deep learning (DNN), a method using not an artificial model (for example, a highly complex relationship to be described in linear correlation, that is, which conversion each frequency contributes to and how much each frequency contributes) but getting hidden layers can be implemented. As one specific method, a method to be used in a framework of DNN-HMM reported in Section 3.2 of Literature B (Naoyuki KANDA. Acoustic Model based on Deep Learning in Speech Recognition. Journal of Acoustical Society of Japan, vol. 73, No. 1, 2017, pp. 31-38 <https://www.jstage.jst.go.jp/article/jasj/73/1/73_31/_pdf>) is as follows. The definition of the acoustic feature X based on HMM is as described in the following (6). Literature B is incorporated herein by reference in its entirety.

(i) An acoustic model based on the existing GMM-HMM is learned.

(ii) A maximum likelihood hidden state is obtained for each time of learned data.

(iii) The maximum likelihood hidden state is considered as a true label, and DNN that predicts a hidden state from an acoustic feature is learned.

Specifically, DNN is learned such that, when the true label is a hidden state of the jth type, the jth value of an output vector is 1 and the other values are 0. When a new acoustic feature xt is input to the learned DNN, the jth element yt,j of the output vector of DNN is considered to indicate a posterior probability of the hidden state of the jth type. Thus, what is needed is not a posterior probability Pr(st|xt) but an output probability Pr(xt|st). Therefore, the posterior probability Pr(st|xt) can be omitted as being irrelevant to optimization by using Bayes' theorem (the expression (1) and the expression (2) in Literature B)). Pr(st) can be obtained from the appearance frequency of a true label.

(6) End-to-End Method with Only DNN

A method using an End-to-End (E2E) model that is reported in Section 3.3 in Literature B will be described as one of methods to be used in speech recognition by means of deep learning and a model close to the purport of the present application.

A speech recognition model using HMM is able to express an acoustic feature sequence X as follows as a problem to search for a word sequence W={wi, . . . , wI}.

$$\tilde{W} = \arg\max_{W} Pr(W \mid X) \quad (1)$$

$$= \arg\max_{W} Pr(X \mid W)Pr(W) \quad (2)$$

This expression can use the fact that the posterior probability Pr(X) is irrelevant to optimization of w by using Bayes' theorem. A prior probability Pr(W) of a word sequence is obtained by a language model.

An End-to-End model is to try modeling Pr(WX) of the expression (1) more directly by using a neural network apart from the expression (2) that is the base of the framework of HMM. A large number of components are individually trained in the framework of HMM. In contrast, in this method, training is performed in one network. Thus, all the components may be optimized at the same time. Since the number of components is one, it is advantageous in simplified learning process.

However, to learn the probability distribution of a word sequence, a speech corpus is too small. When a network is constructed by setting a word as an output, it is difficult to add a new meaning later. However, in the case of the present application, the method is performed by using only word samples limited to a certain number, so, in the example of speech searching as described in Literature C (Dong Yu, Li Deng, George E. Dah 1. Roles of Pre-Training and Fine-Tuning in Context-Dependent DBN-HMMs for Real-World Speech Recognition. NIPS 2010 workshop on Deep Learning and Unsupervised Feature Learning, December 2010<https://www.microsoft.com/en-us/research/publication/roles-of-pre-training-and-fine-tuning-in-context-dependent-dbn-hmms-for-real-world-speech-recognition/>), an example in which a model is trained by using a sub-word sequence L, such as a character sequence and a phoneme sequence, as a true label is usable. Literature C is incorporated herein by reference in its entirety.

Experiments in Literature C were performed in 2008 on data collected from Bing mobile speech searching application. Applications to search for businesses and places are limitedly collected from mobile phones via speeches. All the speech files are sampled at a rate of 8 kHz and encoded by GSM codec. A data set includes noise, music, speech, accent, sloppy pronunciation, hesitation, repetition, intermission, various audio channels, and the like. A data set includes 130-hour labelled, 2000-hour (user click information-based) managed training data, 6.5-hour (or 8,777-speech) verification data, and 9-hour (12,758-speech) test data. The official language sample set of Carnegie-Mellon University (65,000 vocabularies) is used for comparison.

In this case, a model trained by using clicks of a user as training data expresses Pr(LIX) with the sub-word sequence L as a true label. In performing speech recognition intended for speech searching in this way, searching for the highest-score word sequence in combination with a language model is performed.

(7) Addendum

Figure 10:
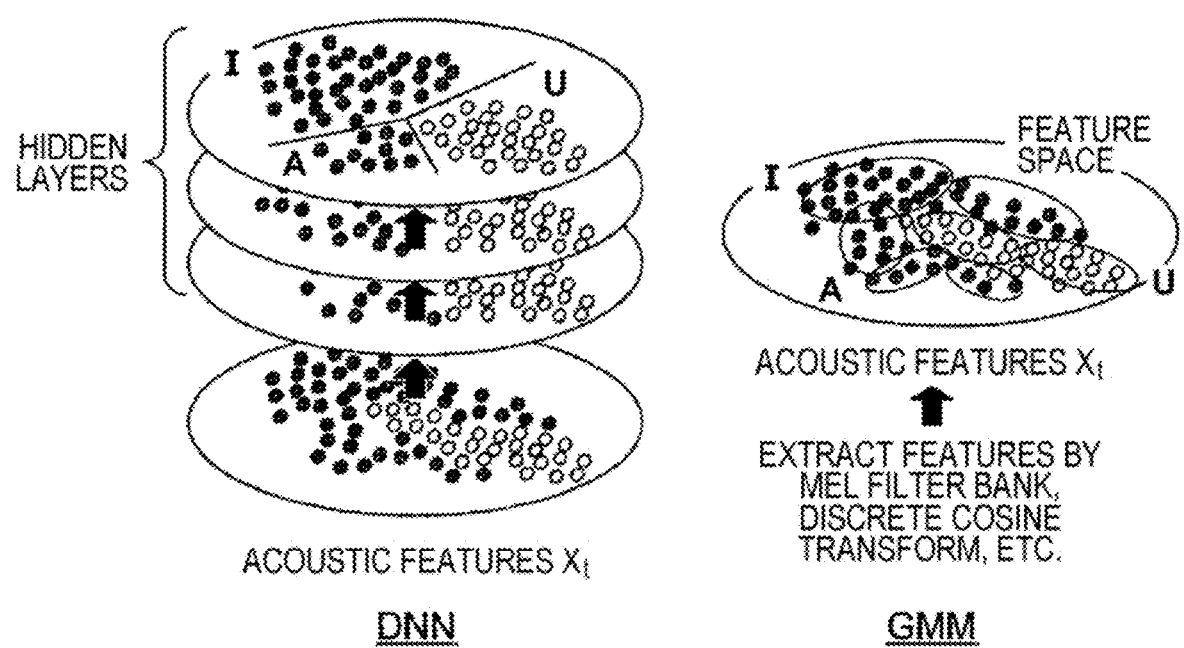
FIG. 10 is a schematic view of a comparison between Gaussian Mixture Model (GMM) and Deep Neural Network (DNN)

A technique according to the present disclosure obtains conversion having appropriate converted speech features Y, expected by a user (or another user), for acoustic features X of an input speech of the user for a voice changer (not a word sequence searching task by speech) (when features Y are obtained for features X, a first parameter to a third parameter are also obtained from the features X and the features Y). A space of speech features is a multi-dimensional (human-hard-to-understand conceptual) space as shown in FIG. 10; however, the space is actually formants f0, f1, f2 described in the specification and is also a spectral envelope. In other words, a space of speech features is replaced with a problem for obtaining End-to-End conversion to obtain a spectral envelope from a spectral envelope. A spectral envelope, as described above, can be acquired as a number sequence of the logarithms of frequencies (or a graph drawing the number sequence) by using MFCC. Thus, by changing the window function between wide and narrow while using the shape of a close spectral envelope, a childish voice or a deep voice can be obtained. By using the input of a user as training data, the input of the user can be an evaluation function for obtaining intended conversion, so it is handleable. FIG. 10 cites FIG. 3 of Literature B.

As a specific proposed method, a user is caused to record samples of several types by using sample scenarios tagged by fixed time frame (as training for emotional expression using a voice changer and a special facial expression). This approach fits in because of its similarity with after-recording of an animation ("after-recording style").

Phenomes to be used do not necessarily need to be included, and, when speaking speed and appearance probability of each phoneme sample vary among people (even when samples divided by a recording time or the like are used), for example, pronunciation of "AIUEO" can be "aiueo" or "aaaiiuueeoo". However, it is possible to express "aiueo" by using a connectionist temporal classification (CTC) function.

In processing flows using these types of deep learning, a linguistic knowledge or an artificial model setting in speech processing (individual designation as to how a waveform is converted) is not needed. After getting features in a time direction, a general deep learning framework oriented for image processing can be implemented by being applied to speech features (as unknown input). One-to-one voice conversion and the like using GAN or DCGAN have been proposed one after another as the latest techniques. However, the basic concept that the pitch of a voice and perceptional characteristics can be changed by getting a fundamental frequency and a spectral envelope remains unchanged.

(8) Summary

In terms of "using deep learning", the technique described in Section 5-3 differs from the embodiments described above in that accuracy is increased by not performing conversion in accordance with the knowledge of a speech signal or by using a known associated model from a feature space but by directly using hidden layers of DNN of which an original feature space is projected to an optimal space for recognition through multi-stage nonlinear conversion. This is because of such a physical reason that a speech itself is, as commented at the beginning, a phenomenon passing through a plurality of physical phenomena characterized by vocal cord using a physical shape and contributing to a fundamental frequency and resonance of nasal cavity and vocal tract.

An algorithm of a voice changer in itself does not vary between the technique described in the above embodiments and the technique using deep learning. The pitch of a voice depends on the fundamental frequency caused by the vocal cord, and the resonance point of the spectral envelope varies depending on the shape of nasal cavity and the shape of vocal tract. It is presumable that an expansion and contraction of the spectral envelope on frequency axis directly coincides with an expansion and contraction of the vocal tract. Thus, when the voice of a male is intended to be converted to the voice of a female or the voice of a child, a sampled frequency scale just needs to be expanded to a higher side and then subjected to an inverse Fourier transform. Data used in general deep learning has been mostly applied to the absolute value of Fourier transform and cannot be directly applied to an inverse Fourier transform. Therefore, processing called phase estimation is performed. Phase estimation is to approximate phase information lost through absolute value processing. In phase estimation, approximation is used, so accurate reconstruction is not performed. In phase estimation used in generating results through an inverse Fourier transform in this example of one-to-one changeover of speakers, the algorithm called Griffin/Lim Algorithm (https://qiita.com/KSRG_Miyabi/items/2a3b5bdca464ec1154d7) is used. In accordance with the spectral structure of a speech, described at the beginning, waves synthesized from a spectral fine structure (vocal cord vibration) expressed by a fundamental frequency and resonance peaks (the shape of nasal cavity and the shape of vocal tract) that can be described by a spectral envelope structure are output.

(9) Additional Remarks

By performing training with a DNN-HMM bottleneck layer added just before an output layer, the amount of computation is reduced without decreasing accuracy. Samples of four types of a user are obtained by changing the pitch of a voice controllable by himself or herself By taking a difference in the pitch of a voice the user can speak, not only a method conforming with an acoustic model with which a fundamental frequency and resonance part parameters (formants) can be obtained (as described in the above embodiments) but also an effective method integrating the above method with a statistical signal processing technique will be described below.

Figure 11:
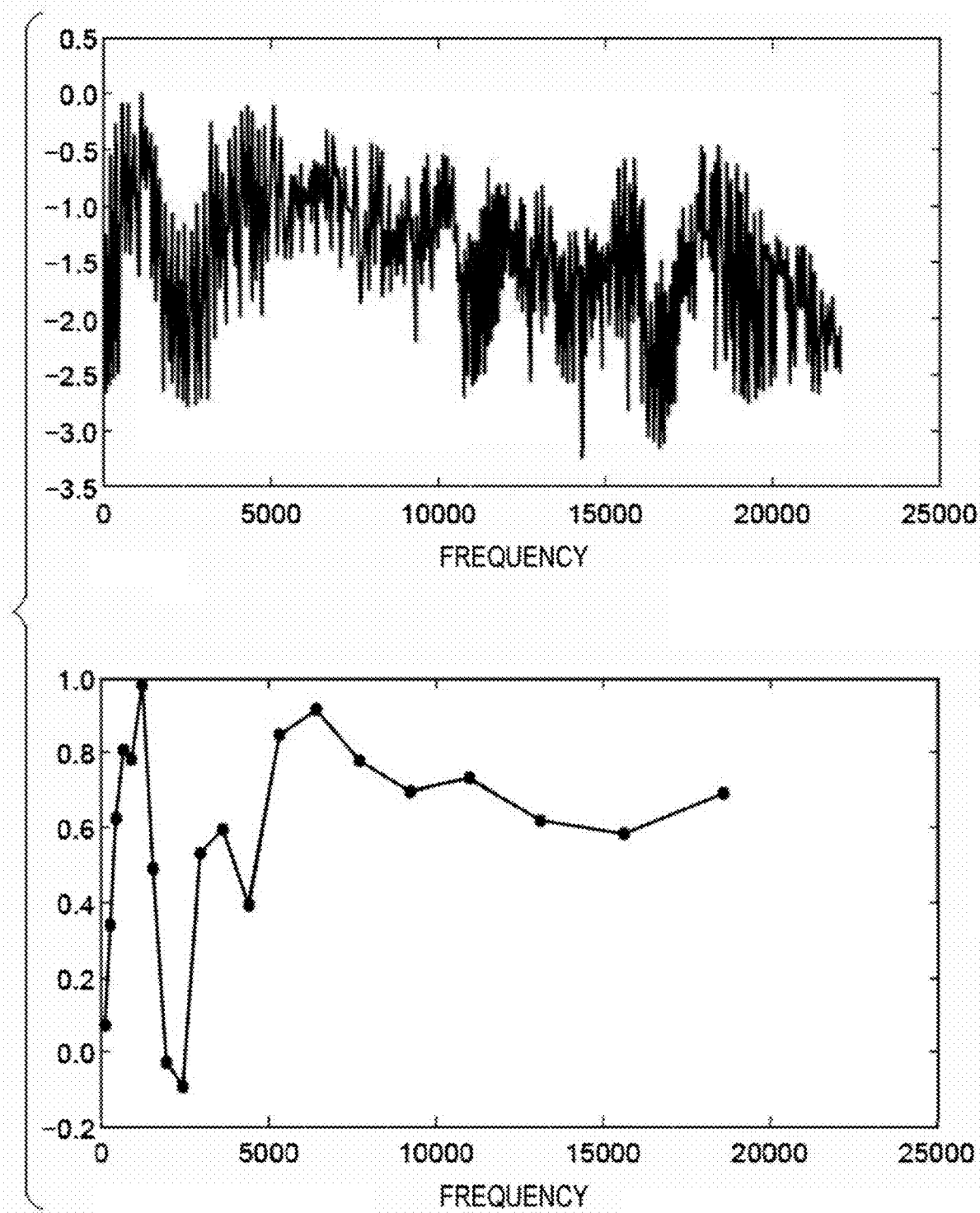
FIG. 11 is a schematic view for illustrating a technique to reduce an amount of computation by using a pitch difference as a hint parameter in process of acquiring mel frequency cepstral coefficients (MFCC)

(9-1) Compressing Amount of Computation by Using Pitch Difference as Hint Parameter in Process of Acquiring MFCC This technique obtains a spectral envelope of a sample by means of MFCC in many techniques using GMM, DNN, and HMM. This technique is able to use samples spoken by the same user with a pitch difference and reduce the dimensions of a filter bank in accordance with the difference in a step of (iii) compressing the amplitude spectrum by applying a mel filter bank to the amplitude spectrum in MFCC processing described in (3)(iii) for MFCC. There is a filter bank of which each row is a matrix corresponding to one bandpass filter (triangle). In speech recognition, as shown in FIG. 11, mostly 20 bandpass filters are used (where the number of FFT samples (nfft) is set to 2048, the number of columns is 1024 when taking up to half the sampling theorem/Nyquist frequency). In the next step, each filter of a mel filter bank is applied to the amplitude spectrum, the filtered amplitudes are added together, and the logarithm of the resulting value is taken. Thus, the amplitude spectrum is compressed into the same dimensions as the number of channels of the mel filter bank. In this example, when the number of channels is 20, 20-dimensional data is generated. When the 20-dimensional data is plotted by using the original logarithmic amplitude spectrum and the mel filter bank, the result is as shown in FIG. 11.

<Code Example>

Apply each filter of the filter bank to an amplitude spectrum and take the logarithm of the sum of the amplitudes mspec=[ ]

for c in np.arange(0, numChannels):

mspec.append($np$. log 10(sum(spec*filterbank[c])))

mspec=$np$.array(mspec)

Actually, even when for loop is not used, simpler code can be written by using multiplication of matrices as follows. This is because applying a filter and adding amplitudes together can be expressed by inner product.

Apply a mel filter bank to an amplitude spectrum mspec=$np$. log 10($np$.dot(spec,filterbank.$T$))

The same result is obtained with either method. As described above, a DCT is applied in a downstream step, so reduction of the dimensions (as long as features are maintained) does not matter.

(9-2) Acquiring Features Using Samplings Including Pitch as Input

At the time of acquiring MFCC, MFCC are acquired by using three types of pitch, that is, high pitch, low pitch, and ordinary pitch for sampling, the features are incorporated in GMM and DNN, and then features of all the users are acquired and classified. Features mixedly including a high pitch to a low pitch that can be spoken by each user are acquired as MFCC, and the structure of a speech can be estimated as a vocal cord vibration control range. The control range can be estimated to be narrow in width for average people and wide in width for trained singers and the like. This range can represent the feature of a user because the user is able to freely control the range to express emotion in speech as the pitch of a voice. Thus, the control range can be used in proposal to users by clustering similar users or limiting handleable voice changers.

(9-3) Acquiring Features Including Desired Character Expression

In this technique, samples of four types of a user are obtained by changing the pitch of a voice controllable by himself or herself. Different from the type "Difference in the pitch of a voice the user can speak" proposed in (9-2), a desired voice is acquired as a sample in the fourth place. By taking a difference between these samples and the feature space (frequency spectrum) obtained in (9-2), resonance part parameters artificially modifiable by a user, except for Pr(W) in DNN model, can be obtained. As for the structure of a speech, this element relates to the shape of nasal cavity and the shape of vocal tract, and mouth radiation. Pr(W) is excluded by taking a difference from the feature space, so this element can be estimated as the range of a fundamental frequency, that is, as in the case of (9-2), a type of vocal cord vibration control range. Empirically, this can be similar to a falsetto. There is such a feature that almost no harmonics appear in a falsetto, so such an expression trying to express a character by artificially changing a spectral envelope and formants (while sacrificing harmonics) is possible. It is conceivable to use the features to cluster users who can make similar modifications or propose a conversion target after a voice change or a suitable conversion model. Alternatively, by comparing a difference in spectral envelope among four samplings, such a proposal that "Use not the ordinary voice but the falsetto as an input speech" is possible. It is advantageously possible to indicate a reasonable reason to users that it is difficult to implement in a hardware voice changer and individual profiles are collectively held on SNS or the like.

5-4. Other (1)

In the above-described various embodiments, the case where a fundamental frequency, a first formant, and a second formant are used as a plurality of features is described. However, the technical idea described in the specification is also applicable to a case where any other features are used as a plurality of features as long as at least some of purposes described in the specification can be solved.

For example, the technical idea described in the specification is also applicable to a case where a fundamental frequency, a spectral envelope, and an aperiodic indicator are used as a plurality of features. Here, the spectral envelope is obtained by smoothing a spectrum and represents timbre. The aperiodic indicator indicates influences of fluctuations of vocal cord vibration and inclusion of noise. Such an example can be understood as one using a spectral envelope and an aperiodic indicator instead of a first formant and a second formant in the above-described various embodiments. Extracting a fundamental frequency, a spectral envelope, and an aperiodic indicator from a speech signal, converting the extracted features, and synthesizing a processed speech signal are a known technology. This is described in, for example, Masanori MORISE. Examples of Extension and Implementation for Realizing Real-Time Speech Synthesis with Speech Analysis and Synthesis System WORLD. Information Processing Society of Japan, Technical Report, Aug. 1, 2016 <http://www.kki.yamanashi.ac.jp/~mmorise/publication/paper/IPS J-MUS16112020.pdf>. This Literature is incorporated herein by reference in its entirety.

In the above-described various embodiments, as one example, the case where a plurality of features (for example, first formant, second formant, spectral envelope, aperiodic indicator, and the like) is extracted or processed for each of five vowels separately spoken by a user is described. However, in addition to this, a plurality of features may be extracted or processed for each of at least one consonant separately spoken by a user. The consonant may be a consonant in Japanese or may be a consonant in a language other than Japanese.

The above-described various embodiments can be used in combination as long as there is no contradiction. For example, at least two of the following three embodiments can be used in combination.

(1) Embodiment in which a converter is acquired by the technique described with reference to FIG. 7 and the like (2) Embodiment in which any one of one or more first candidate converters is acquired by the technique described with reference to FIG. 8 and the like (3) Embodiment in which any one of one or more second candidate converters is acquired by the technique described with reference to FIG. 8 and the like In the above-described embodiments, as one example, the case where the terminal 20 extracts features, converts the features, generates an output speech signal, and performs other processing by using a speech signal of a speech of a user is described. However, such operations can also be performed by the server 30 and the studio unit 40 each having a similar configuration to that of the terminal 20.

The above-described various embodiments are only specific examples and can be, for example, implemented as the following various modes.

(1) First Mode

In a first mode, as illustrated with reference to FIG. 4, only the terminal 20 is able to perform ST402 to ST410. Thus, the terminal 20 is able to convert the speech signal (fifth speech signal) input in ST408 by using an acquired converter.

(2) Second Mode

In a second mode, the terminal 20 is able to send the speech signal (fifth speech signal) input in ST408 to the server 30 by, for example, streaming. The server 30 is able to convert the fifth speech signal received in this way by using a converter. In this case, the server 30 is able to acquire, from the terminal 20 having performed ST402 to ST406, information about the converter acquired by the terminal 20. The server 30 is able to convert the fifth speech signal by using the acquired converter. In another example, the server 30 may convert the fifth speech signal by using a converter selected for the user (by the user or the server 30) from among a plurality of converters held by the server 30.

In any case, for example, the technique described above in relation to ST410 can be used for voice conversion to be performed by the server 30.

(3) Third Mode

In a third mode, the terminal 20 and the server 30 are able to perform processing needed for voice conversion in cooperation with each other. Specifically, the terminal 20 is able to perform some of ST402 to ST410, and the server 30 is able to perform the other steps. For example, the terminal 20 is able to acquire a first speech signal to a fourth speech signal in ST402 and acquire a fifth speech signal in ST408. The terminal 20 is able to send the acquired first speech signal to the fourth speech signal and the fifth speech signal to the server 30. The server 30 is able to perform ST404, ST406, and ST410.

This is only one example. The terminal 20 is able to perform ST402 and ST404 and send information and the like about the features extracted in ST404 and the fifth speech signal acquired in ST408 to the server 30. The server 30 may perform ST406 and ST410.

Alternatively, the terminal 20 is able to perform ST402 to ST408 and perform part of voice conversion processing in ST410. The server 30 is able to perform the remaining part of voice conversion processing in ST410. In other words, the terminal 20 and the server 30 are respectively able to perform the upstream part and downstream part (quality improvement) of voice conversion processing in ST410.

(4) Fourth Mode

In a fourth mode, the terminal 20 and the server 30 are able to perform voice conversion processing in redundancy system so as to respectively output speech signals converted in different quality. For example, the terminal 20 is able to output a relatively low-quality converted speech signal to maintain real-time property (or a relatively high-quality speech signal on the contrary) by performing ST402 to ST410. On the other hand, in parallel with this operation, the server 30 is able to output a relatively high-quality speech signal (or a relatively low-quality speech signal to maintain real-time property on the contrary) by converting a speech signal (fifth speech signal) received from the terminal 20 with a converter. A method of acquiring a converter by the server 30 can be similar to that of the second mode or the third mode. The quality of a speech signal to be converted can be changed in accordance with, for example, known various elements. Here, known various elements can include the amount of memory to be allocated in voice conversion processing, sampling frequency, and the like. Whether the terminal 20 is able to perform voice conversion processing focusing on any one of real-time property and speech quality (and/or the server 30 performs voice conversion processing focusing on any one of speech quality and real-time property) can be selected by the user of the terminal 20 (for example, at selected timing).

5-5. Other (2)

A plurality of converters generated by various techniques described in relation to the above-described various embodiments can be stored in a storage. The storage may be the server 30, the terminal 20, the studio unit 40, and/or the like. The plurality of converters stored in the storage in this way is usable by each of the users who use the terminal 20, the studio unit 40, the server 30, and/or the like.

The quality of each converter to be stored in the storage in this way and provided to each user can be generally not easily evaluated by the user. In one embodiment, evaluation of each of at least some of converters stored in the storage can be determined by multiplying, for example, at least one of the following coefficients (1) to (6).

(1) Coefficient proportional to the number of past purchases by any one of users, a plurality of users, or all the users (2) Coefficient proportional to the number of reviews posted on a web site and/or an SNS by any one of users, a plurality of users, or all the users (3) Coefficient proportional to the number of shares on a web site and/or an SNS by any one of users, a plurality of users, or all the users (4) Coefficient proportional to the number of references on a web site and/or an SNS by any one of users, a plurality of users, or all the users (5) Coefficient proportional to the number of uses on a web site and/or an SNS by any one of users, a plurality of users, or all the users (6) Coefficient proportional to the number of links and tags generated to jump to a web site and/or an SNS for getting the converter (furthermore, a speech signal before being converted by the converter and a speech signal obtained as a result of conversion by the converter) on a web site and/or an SNS by any one of users, a plurality of users, or all the users Such evaluation of a converter can correspond to evaluation on at least one of a plurality of the following elements.

At least one of various parameters including a first parameter to a third parameter included in the converter Algorithm to be used in the converter Voice subjected to conversion by the converter (that is, speech signal before conversion) and voice obtained as a result of conversion by the converter (that is, speech signal after conversion)

A converter given a high rating in accordance with such coefficients can be preferentially recommended to a plurality of users over a converter given a lower rating than the above converter. For example, the converter 550 to the converter 554 and/or the converter 560 to the converter 564, described with reference to FIG. 9, are given high ratings in accordance with the above-described coefficients and therefore are preferentially presented to users over the other of the plurality of converters. The converter 800A to the converter 800E, described with reference to FIG. 12, are also given high ratings in accordance with the above-described coefficients and therefore are preferentially presented to users over the other of the plurality of converters.

Data related to converters given high ratings in accordance with such coefficients may be preferentially used as learning data in the case where a new converter is generated by machine learning. For example, data including a speech signal before conversion, and at least one of various parameters including generated first parameter to third parameter in relation to a converter given a high rating in accordance with the above coefficients can be preferentially used as, for example, training data. Thus, a learning model for generating a new converter can be constructed.

The storage is able to store and update at least one of the above-described coefficients (1) to (6) in association with each of at least some of converters. When there is no action listed in the above-described coefficients (1) to (6) for a converter, the storage is able to store and update such a fact as negative information in association with the converter.

When the storage receives a request to a converter from each of the users who use the terminal 20, the studio unit 40 and/or the server 30, the storage is able to send the converter and coefficients stored in association with the converter to the user. Thus, the user is able to recognize a value reflecting the received coefficients as the rating of the converter via the terminal 20 or the like the user uses.

A plurality of converters stored in the storage is usable by users who use the terminal 20, the studio unit 40, and/or the server 30 as described above. The value of each converter that can be used by each user can be determined by, for example, at least one of the following elements (A) to (D).

(A) Price of the converter (B) Available number of times of the converter (C) Available time of the converter (D) Concurrent user limit of the converter For (A), when the price of a converter is expensive (or cheap), it can mean that the value of the converter is high (or low). For (B), the available number of times of a converter can mean the upper limit available number of times of the converter. When the available number of times of a converter is small (or large), it can mean that the value of the converter is high (or low). For (C), the available time of a converter can mean the upper limit available time of the converter. When the available time of a converter is short (or long), it can mean that the value of the converter is high (or low). For (D), the concurrent user limit of a converter can mean the upper limit number of uses who can concurrently use the converter. When the concurrent user limit of a converter is small (or large), it can mean that the value of the converter is high (or low).

FIG. 12 is a schematic view illustrating how the value of each converter is presented to a user who uses the terminal 20 or the like in the communication system 1 shown in FIG. 1. FIG. 12 shows an example in which the five converters 800A to 800E are displayed on the display section 220 as at least one converter to be recommended to a user. Each of the converters 800A to 800E can be displayed together with information related to the converter (for example, an image or photograph corresponding to a character, a name corresponding to the character, a preset number, and the like).

Each of the converters 800A to 800E can be displayed together with at least one piece of information indicating the value of the converter. FIG. 12 shows an example in which the price of the converter, the available number of times, available time, and concurrent user limit are displayed as at least one piece of information indicating the value of each converter. In another embodiment, at least one of these pieces of information may be displayed.

When focusing on, for example, prices, the value (400 yen) of the converter 800A is twice as high as the value (200 yen) of the converter 800B. When focusing on the available number of times, the value (10) of the converter 800A is twice as high as the value (20) of the converter 800B. When focusing on the available time, the value (10 minutes) of the converter 800A is twice as high as the value (20 minutes) of the converter 800B. When focusing on the concurrent user limit, the value (1) of the converter 800A is twice as high as the value (2) of the converter 800B.

In one embodiment, the value of each of converters that can be used by users can be changed (updated) by multiplying, for example, at least one of the above-described coefficients (1) to (6).

Each user is able to determine which converter the user buys by referring to the value of each converter presented in this way.

Figure 13:
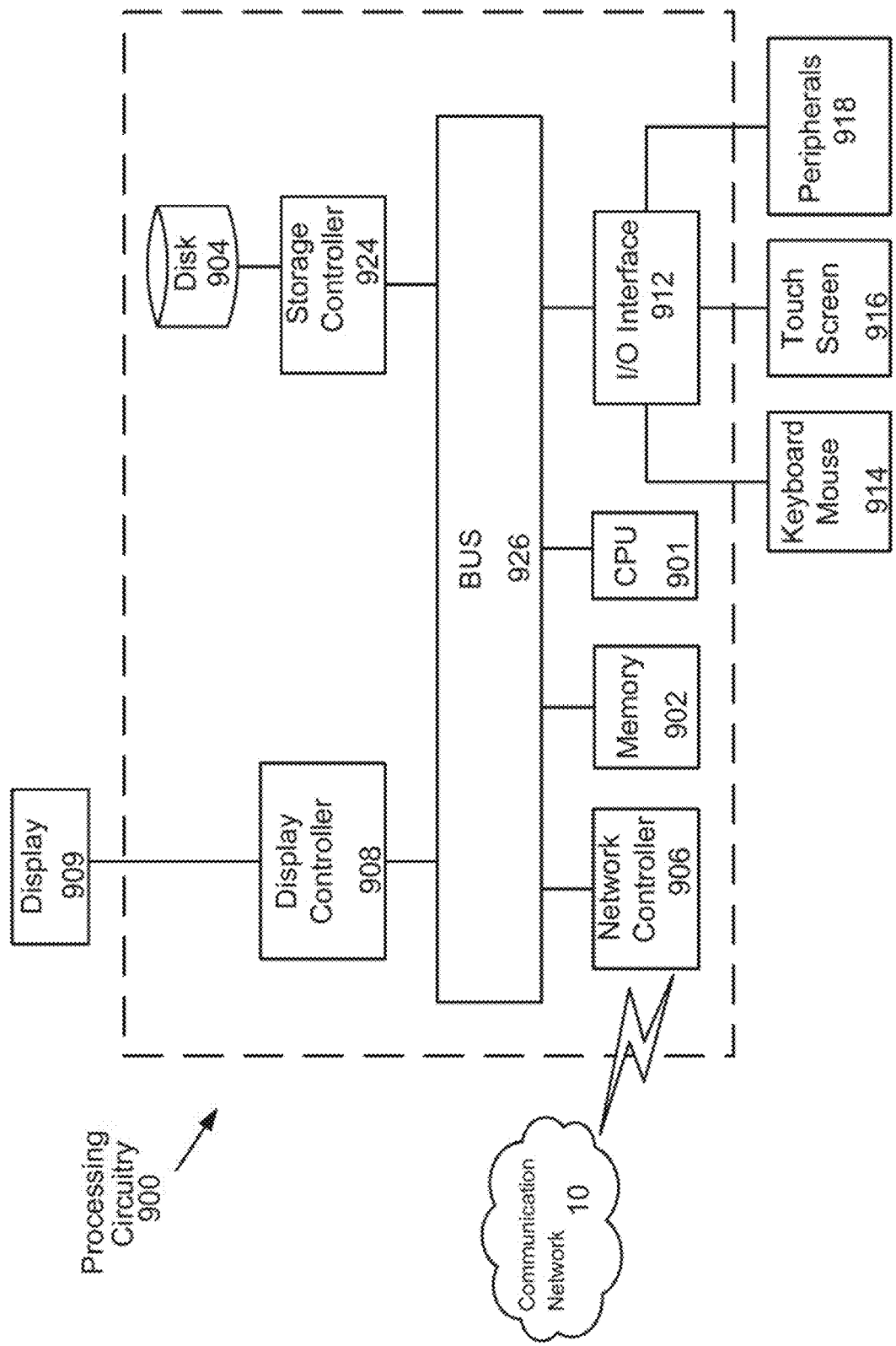
FIG. 13 is a block diagram of processing circuitry that performs computer-based operations in accordance with the present disclosure.

FIG. 13 is a block diagram of processing circuitry that performs computer-based operations in accordance with the present disclosure. FIG. 13 illustrates processing circuitry 900 of control unit 100, which corresponds to central processing unit 21 that is a component of terminal 20 and central processing unit 31 that is a component of server 30.

Processing circuitry 900 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 13, the processing circuitry 900 includes a CPU 901 which performs one or more of the control processes discussed in this disclosure. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 900 communicates, such as a server or computer. The processes may also be stored in network based storage, cloud-based storage or other mobile accessible storage and executable by processing circuitry 900.

Further, the claimed advancements may be provided as a utility application, background daemon, or component of an operating system, or combination thereof, executing in conjunction with CPU 901 and an operating system such as Microsoft Windows, UNIX, Solaris, LINUX, Apple MAC-OS, Apple iOS and other systems known to those skilled in the art.

The hardware elements in order to achieve the processing circuitry 900 may be realized by various circuitry elements. Further, each of the functions of the above described embodiments may be implemented by circuitry, which includes one or more processing circuits. A processing circuit includes a particularly programmed processor, for example, processor (CPU) 901, as shown in FIG. 13. A processing circuit also includes devices such as an application specific integrated circuit (ASIC) and conventional circuit components arranged to perform the recited functions.

In FIG. 13, the processing circuitry 900 may be a computer or a particular, special-purpose machine. Processing circuitry 900 is programmed to execute processing to control terminal 20/server 30.

Alternatively, or additionally, the CPU 901 may be implemented on an FPGA, ASIC, PLD or using discrete logic circuits, as one of ordinary skill in the art would recognize. Further, CPU 901 may be implemented as multiple processors cooperatively working in parallel to perform the instructions of the inventive processes described above.

The processing circuitry 900 in FIG. 13 also includes a network controller 906, such as an Ethernet PRO network interface card, for interfacing with communication network 10. As can be appreciated, the communication network 10 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The communication network 10 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 906 may be compliant with other direct communication standards, such as Bluetooth, a near field communication (NFC), infrared ray or other.

The processing circuitry 900 further includes a display controller 908, such as a graphics card or graphics adaptor for interfacing with display 909, such as a monitor. An I/O interface 912 interfaces with a keyboard and/or mouse 914 as well as a touch screen panel 916 on or separate from display 109. I/O interface 912 also connects to a variety of peripherals 918.

The storage controller 924 connects the storage medium disk 904 with communication bus 926, which may be an ISA, EISA, VESA, PCI, or similar, for interconnecting all of the components of the processing circuitry 900. A description of the general features and functionality of the display 909, keyboard and/or mouse 914, as well as the display controller 908, storage controller 924, network controller 906, and I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

6. Advantageous Effects of Various Embodiments

According to the above-described some embodiments, when a user speaks as instructed by the terminal 20 or the like, the terminal 20 or the like is able to acquire (generate or select) appropriate converters to be used by the user in accordance with a plurality of features extracted from a speech signal of such a speech. Thus, the user is able to obtain a desired voice or a voice approximate to a desired voice even when the user does not understand acoustic theory.

According to the above-described some embodiments, the terminal 20 or the like is able to acquire (generate or select) a converter suitable for a speech of a user in accordance with a plurality of features extracted from a speech signal of the speech of the user. Thus, even a user who does not clearly determine an intended voice is able to receive presentation of converters to variously change his or her own voice.

According to the above-described some embodiments, a user is able to easily provide a speech signal generated by the terminal 20 or the like to a communication network (for example, the server 30, another terminal 20, and the like) in accordance with real-time processing or non-real-time processing.

According to the above-described some embodiments, a user is able to use the terminal 20 with a built-in microphone (for example, a smartphone, a tablet, a desktop or laptop personal computer, a mobile phone, or the like). Thus, the user is able to obtain a speech signal processed from his or her own voice without considerations of a distance between the user and a microphone, the type of the microphone in use, influences due to noise, and the like. This also similarly applies even when a user uses the server 30 or the studio unit 40 installed in a studio or another location as long as an appropriate microphone is installed in advance in an appropriate place by an expert or an engineer.

According to the above-described some embodiments, a user is able to easily provide a speech signal generated by the terminal 20 or the like to a communication network (the server 30, another terminal 20, or the like). Thus, it is possible to evaluate a generated speech signal by receiving objective feedback from other users or the like.

7. Technical Field of the Present Disclosure

The technology of the present disclosure can be applied to, for example, the following fields.

(1) Application services that stream speeches and/or videos via a communication network and/or a broadcasting network (2) Application services that provide communications using speeches (chat applications, messengers, mail applications, and the like)

(3) Gaming services that enable sending speeches of users (shooting games, dating simulation games, roll playing games, and the like).

The following documents are incorporated by reference in their entirety:

Baidu, Inc. LisPon [online], Sep. 17, 2018 [retrieved on 2018 Nov. 2]. Retrieved from the Internet:<URL:https://lispon.moe/>, Roland Corporation. VT3 Voice Transformer [online], Mar. 8, 2014 [retrieved on 2018 Nov. 2]. Retrieved from the Internet:<URL:https://www.roland.com/jp/products/vt-3/>, Moe KOIGOE. Koigoe [online], May 1, 2018 [retrieved on 2018 Nov. 2]. Retrieved from the Internet:<URL:http://www.geocities.jp/moe_koigoe/index.html>, User Local, Inc. User Local Voice Changer [online], Aug. 1, 2018 [retrieved on 152018-11-02]. Retrieved from the Internet:<URL:https://voice-changer.userlocal.jp/>, and Japanese Unexamined Patent Application Publication No. 2007-114561.

What is claimed is:

1. A non-transitory computer readable medium storing computer executable instructions which, when executed by at least one processor, cause the at least one processor to:
   acquire a speech signal of speech of a user;
   perform a signal processing on the speech signal to acquire at least one feature of the speech of the user, wherein the at least one feature includes a first formant, a second formant, and/or a fundamental frequency; and
   control display of information, related to each of one or more first candidate converters having a feature that is within a minimum and maximum value of the at least one feature, to present the one or more first candidate converters for selection by the user.

2. The non-transitory computer readable medium according to claim 1, wherein
   the at least one processor is further caused to control display of information related to each of the one or more first candidate converters to present the one or more first candidate converters for selection by the user, and
   the one or more first candidate converters have a first formant, a second formant, and/or a fundamental frequency corresponding to the acquired first formant, the acquired second formant, and/or the acquired fundamental frequency of the user.

3. The non-transitory computer readable medium according to claim 2, wherein the information related to each of the one or more first candidate converters includes information about a person and/or a character having a voice similar to a voice of the user.

4. The non-transitory computer readable medium according to claim 1, wherein the at least one processor is further caused to control display of information related to each of one or more second candidate converters to present the one or more second candidate converters for selection by the user.

5. The non-transitory computer readable medium according to claim 4, wherein the information related to the one or more second candidate converters is displayed due to the one or more second candidate converters being used by plural other devices at a high rate and/or at a high usage count.

6. The non-transitory computer readable medium according to claim 4, wherein the information related to each of the one or more second candidate converters is displayed irrespective of whether the one or more second candidate converters has a feature corresponding to the at least one feature.

7. The non-transitory computer readable medium according to claim 4, wherein the information related to each of the one or more second candidate converters includes information about a person, a character, and/or an intended voice.

8. The non-transitory computer readable medium according to claim 1, wherein the at least one processor is further caused to
   estimate emotion and/or personality of the user in accordance with the first formant, the second formant, and loudness indicated in a result of the signal processing of the speech signal, and
   extract the one or more first candidate converters from among a plurality of prepared converters in accordance with information indicating the estimated emotion and/or personality.

9. The non-transitory computer readable medium according to claim 1, wherein the at least one processor is further caused to separately acquire a first speech signal of high-pitched speech of the user and a second speech signal of low-pitched speech of the user, perform a signal processing on the first speech signal and the second speech signal to acquire a plurality of features of speech of the user, and acquire, in accordance with the plurality of features, a converter that converts at least one of the plurality of features on an input speech signal to generate an output speech signal.

10. The non-transitory computer readable medium according to claim 9, wherein the plurality of features includes a first formant, a second formant, and a fundamental frequency.

11. The non-transitory computer readable medium according to claim 10, wherein the at least one processor is further caused to acquire a third speech signal of a natural speech of the user, and perform a signal processing on the first speech signal, the second speech signal, and the third speech signal to acquire the first formant, the second formant, and the fundamental frequency.

12. The non-transitory computer readable medium according to claim 10, wherein the converter includes a first parameter indicating a first frequency to which the first formant of the input speech signal is shifted, a second parameter indicating a second frequency to which the second formant of the input speech signal is shifted, and a third parameter indicating a third frequency to which the fundamental frequency of the input speech signal is shifted.

13. The non-transitory computer readable medium according to claim 10, wherein the at least one processor is further caused to acquire a frequency range of a voice of the user, obtained in accordance with a minimum value and a maximum value of each of the first formant, the second formant, and the fundamental frequency, and acquire the converter that shifts a pitch while a number of bits to be allocated to a part of the input speech signal included in the frequency range is greater than a number of bits to be allocated to another part of the input speech signal not included in the frequency range.

14. The non-transitory computer readable medium according to claim 10, wherein the at least one processor is further caused to select and acquire the converter from among a plurality of converters prepared, and each of the plurality of converters includes a first parameter indicating a frequency to which a first formant of an input speech signal is shifted, a second parameter indicating a frequency to which a second formant of the input speech signal is shifted, and a third parameter indicating a frequency to which a fundamental frequency of the input speech signal is shifted.

15. The non-transitory computer readable medium according to claim 14, wherein the at least one processor is caused to select and acquire the converter having a first formant, a second formant, and/or a fundamental frequency corresponding to the acquired first formant, the acquired second formant, and/or the acquired fundamental frequency of the user from among the plurality of converters.

16. The non-transitory computer readable medium according to claim 14, wherein the at least one processor is further caused to acquire a fourth speech signal of speech the user speaks in imitation of a desired person or character, perform a signal processing on the each of the first speech signal, the second speech signal, the third speech signal, and the fourth speech signal to acquire a first formant, a second formant and a fundamental frequency and select and acquire another converter having a first formant, a second formant, and/or a fundamental frequency corresponding to the first formant, the second formant, and/or the fundamental frequency of the user, calculated by the signal processing of the fourth speech signal, from among the plurality of converters.

17. The non-transitory computer readable medium according to claim 9, wherein the at least one processor is caused to generate an output speech signal by shifting a pitch of the speech signal as an input speech signal with the converter, and send the output speech signal to a server or a terminal.

18. A device, comprising:

processing circuitry configured to acquire a speech signal of speech of a user;

perform a signal processing on the speech signal to acquire at least one feature of the speech signal, wherein the at least one feature includes a first formant, a second formant, and/or a fundamental frequency; and control display of information, related to each of one or more first candidate converters having a feature that is within a minimum and maximum value of the at least one feature, to present the one or more first candidate converters for selection by the user.

19. A speech signal processing method, comprising:

acquiring, by processing circuitry, a speech signal of speech of a user;

performing, by the processing circuitry, a signal processing on the speech signal to acquire at least one feature of the speech signal, wherein the at least one feature includes a first formant, a second formant, and/or a fundamental frequency; and controlling display of information, related to each of one or more first candidate converters having a feature that is within a minimum and maximum value of the at least one feature, to present the one or more first candidate converters for selection by the user.

* * * * *